(12) United States Patent
Lee

(10) Patent No.: US 8,265,659 B2
(45) Date of Patent: Sep. 11, 2012

(54) MOBILE TERMINAL, METHOD OF MANAGING SCHEDULE USING THE MOBILE TERMINAL, AND METHOD OF MANAGING POSITION INFORMATION USING THE MOBILE TERMINAL

(75) Inventor: Won Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 257 days.

(21) Appl. No.: 12/639,936

(22) Filed: Dec. 16, 2009

(65) Prior Publication Data

US 2010/0222079 A1  Sep. 2, 2010

(30) Foreign Application Priority Data

Mar. 2, 2009 (KR) .................. 10-2009-0017632

(51) Int. Cl.
*H04W 24/00* (2009.01)
*H04M 3/42* (2006.01)

(52) U.S. Cl. ............... 455/456.3; 455/456.1; 455/414.2

(58) Field of Classification Search ............... 455/456.3, 455/456.1, 414.1, 414.2, 412.1, 412.2; 701/201, 701/213; 704/235; 715/733, 963
See application file for complete search history.

(56) References Cited

U.S. PATENT DOCUMENTS

| | | | | |
|---|---|---|---|---|
| 6,925,603 | B1* | 8/2005 | Naito et al. | 715/733 |
| 7,266,376 | B2* | 9/2007 | Nakagawa | 455/456.1 |
| 7,370,085 | B2* | 5/2008 | Brown et al. | 709/217 |
| 7,533,079 | B2* | 5/2009 | Naito et al. | 707/999.1 |
| 7,996,177 | B2* | 8/2011 | Tatsuta et al. | 702/150 |
| 8,065,079 | B2* | 11/2011 | Rogers | 701/207 |
| 2010/0082230 | A1* | 4/2010 | Hong et al. | 701/201 |

* cited by examiner

*Primary Examiner* — Sonny Trinh

(74) *Attorney, Agent, or Firm* — Lee, Hong, Degerman, Kang & Waimey

(57) ABSTRACT

A mobile terminal, a method of managing a schedule using the mobile terminal, and a method of managing position information using the mobile terminal are provided. The method of managing a schedule using the mobile terminal can interoperate schedule information with a navigation function, the method of managing position information using the mobile terminal can manage position information included in audio data received in various forms, and the mobile terminal implements the methods.

23 Claims, 29 Drawing Sheets

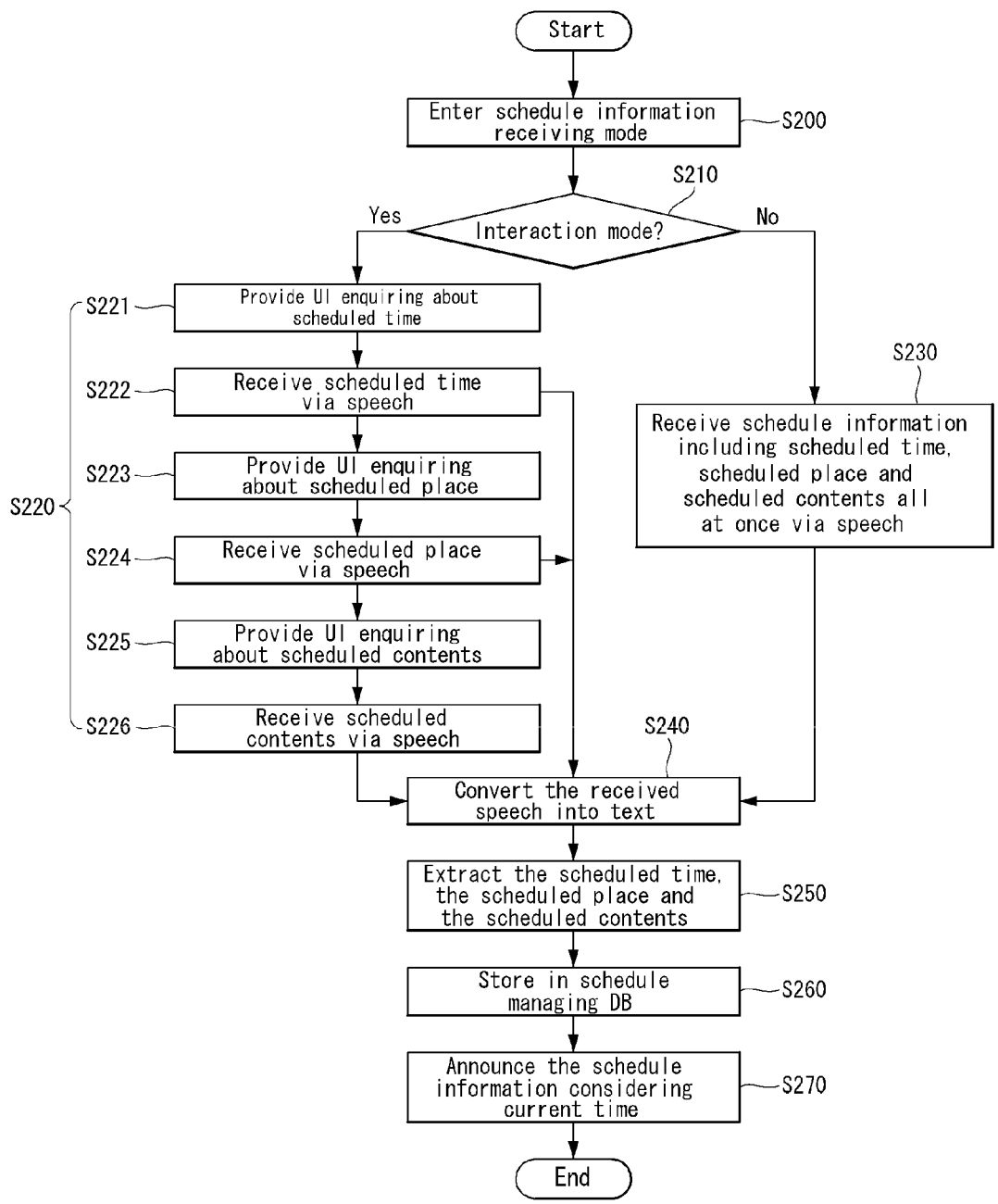

MOBILE TERMINAL, METHOD OF MANAGING SCHEDULE USING THE MOBILE TERMINAL, AND METHOD OF MANAGING POSITION INFORMATION USING THE MOBILE TERMINAL

The present application claims priority to Korean Application No. 10-2009-0017632 filed in Korea on Mar. 2, 2009, the entire contents of which are hereby incorporated by reference in their entirety.

BACKGROUND OF THE INVENTION

1. Field of the Invention

The present invention relates to a mobile terminal, and more particularly, to a method of managing a schedule using a mobile terminal which can interoperate schedule information with a navigation function, a method of managing position information using a mobile terminal which can manage position information included in audio data received in various forms, and a mobile terminal for implementing the methods.

2. Discussion of the Related Art

Nowadays mobile terminals provide a variety of functions. For example, in addition to a communication function, they can provide a speech recognition function using a speech recognition algorithm, a map application processing position information, an application providing a navigation function for mainly providing directions, and an application capable of processing a variety of information such as a scheduler that manages schedule information.

However, although such functions are provided through the mobile terminal, they seldom interoperate with each other. It is necessary for the various functions provided through the mobile terminal to interoperate with each other in order to provide new functions and realize a synergy effect.

SUMMARY OF THE INVENTION

Accordingly, one object of the present invention is to associate or interoperate various functions provided through a mobile terminal to provide new functions and realize a synergy effect.

Another object of the present invention is to interoperate at least two of a navigation function, a schedule function and a speech recognition function with each other to take advantage of the merits of each function and offer convenience to a user.

To accomplish the objects of the present invention, according to a first aspect of the present invention, there is provided a method of managing a schedule using a mobile terminal, comprising: receiving schedule information including a scheduled place and a scheduled time; acquiring an expected time to travel from a current position to the scheduled place; and announcing the schedule information, before the expected travel time exceeds a remaining time which is a difference between the scheduled time and a current time.

To accomplish the objects of the present invention, according to a second aspect of the present invention, there is provided a method of managing a schedule using a mobile terminal, comprising: receiving schedule information formed of speech; converting the received schedule information into text using a speech recognition algorithm; extracting a scheduled time, a scheduled place and scheduled contents from the converted text; and storing the schedule information in a schedule management database of the mobile terminal according to predetermined standards, considering at least one of the extracted scheduled time, scheduled place and scheduled contents.

To accomplish the objects of the present invention, according to a third aspect of the present invention, there is provided a method of managing position information using a mobile terminal, comprising: extracting position information from speech of at least one participant in a call, in the form of text, during the call, using a speech recognition algorithm; driving any one of one or more applications capable of using the extracted position information; and causing the driven application to use the extracted position information.

To accomplish the objects of the present invention, according to a fourth aspect of the present invention, there is provided a method of managing position information using a mobile terminal, comprising: receiving audio data from an external mobile communication terminal through a wire or wirelessly; converting the received audio data into text using a speech recognition algorithm; extracting position information from the converted text; and displaying a point corresponding to the extracted position information on a map.

To accomplish the objects of the present invention, according to a fifth aspect of the present invention, there is provided a mobile terminal, comprising: a receiving unit configured to receive schedule information including a scheduled place and a scheduled time; a position information module configured to acquire position information using a navigation satellite system; and a controller configured to acquire an expected time to travel from a current position acquired using the position information module to the scheduled place, and announce the schedule information, before the expected travel time exceeds a remaining time which is a difference between the scheduled time and a current time.

To accomplish the objects of the present invention, according to a sixth aspect of the present invention, there is provided a mobile terminal, comprising: a receiving unit configured to receive schedule information formed of speech; a memory configured to store a speech recognition algorithm and a schedule management database; and a controller configured to convert the received schedule information into text using the speech recognition algorithm, extract a scheduled time, a scheduled place and scheduled contents from the converted text, and store the received schedule information in the schedule management database according to predetermined standards, considering at least one of the extracted scheduled time, scheduled place and scheduled contents.

To accomplish the objects of the present invention, according to a seventh aspect of the present invention, there is provided a mobile terminal, comprising: a radio communication unit configured to provide a call function; a memory configured to store a speech recognition algorithm, and one or more applications capable of using position information; and a controller configured to extract position information from speech of at least one participant in a call using the radio communication unit, in the form of text, during the call, using the speech recognition algorithm, drive any one of the one or more applications and cause the driven application to use the extracted position information.

To accomplish the objects of the present invention, according to an eighth aspect of the present invention, there is provided a mobile terminal, comprising: a radio communication unit configured to provide a communication function via a network; a memory configured to store a map and a speech recognition algorithm; and a controller configured to receive audio data from an external mobile communication terminal through the radio communication unit, convert the received audio data into text using the speech recognition algorithm, extract position information from the converted text, and display a point corresponding to the extracted position information on a map.

The mobile terminal, the method of managing the schedule and the method of managing the position information using the same according to the present invention have the following effects.

According to the present invention, various functions provided through the mobile terminal are associated or interoperated to provide new functions and realize a synergy effect.

According to the present invention, at least two of the navigation function, the schedule function and the speech recognition function can interoperate with each other. It is thus not necessary to enter a separate menu to execute each function, and it is possible to appropriately offer convenience to a user in various situations.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain principles of the invention. In the drawings:

FIG. 11 is a flowchart of a method of managing a schedule using a mobile terminal according to a second embodiment of the present invention;

DETAILED DESCRIPTION OF PREFERRED EMBODIMENTS

Figure 1:
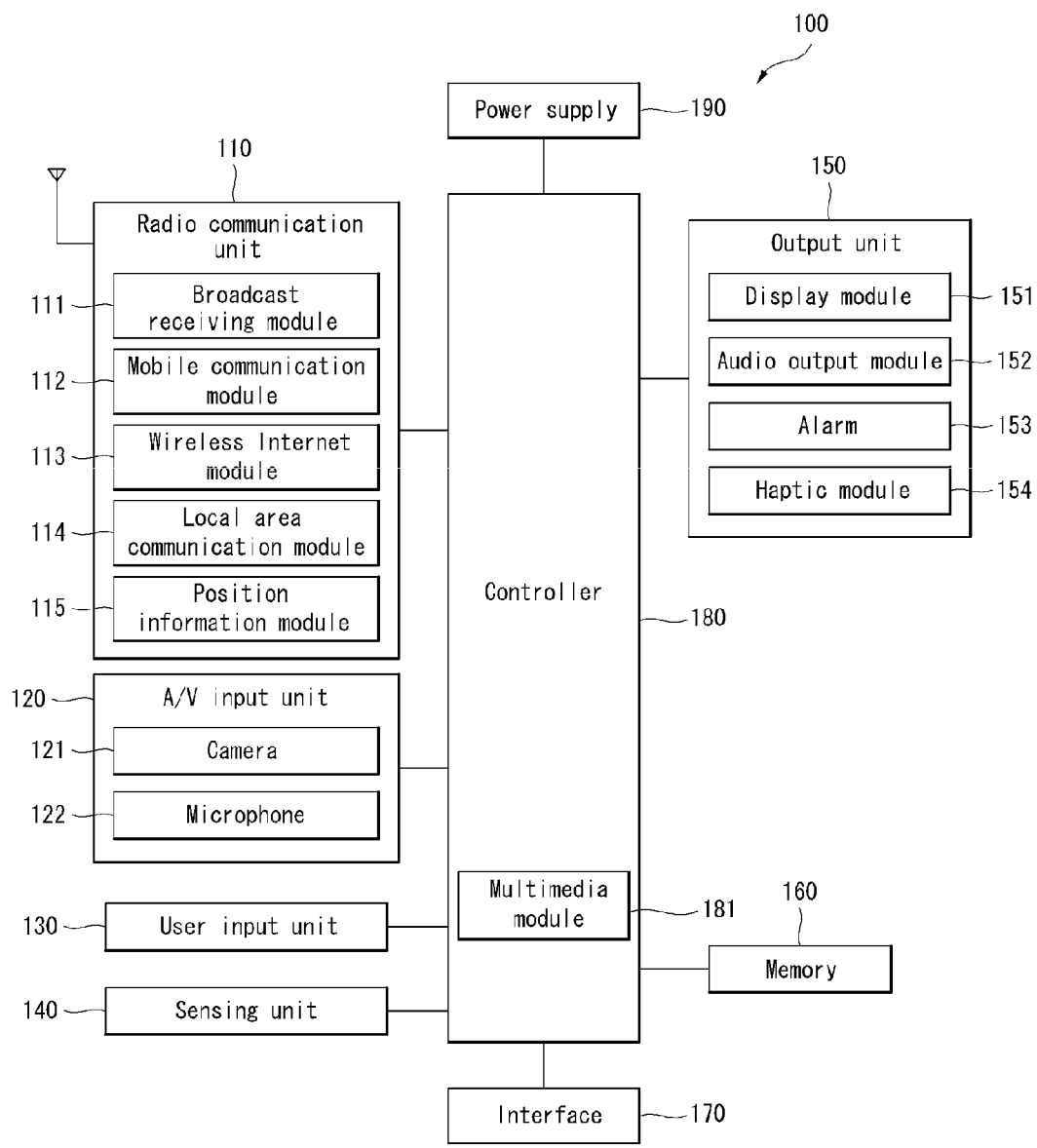
FIG. 1 is a block diagram of a mobile terminal according to an embodiment of the present invention.

The above and other aspects, features and advantages of the present invention will become apparent from the following description given in conjunction with the accompanying drawings. Hereinafter, preferred embodiments of the present invention will be described in detail with reference to the accompanying drawings. Throughout the drawings and description, the same elements are denoted by the same reference numerals. Also, well-known functions or constructions are not described in detail since such description would detract from the clarity and concision of the disclosure of the invention.

Hereinafter, a mobile terminal according to the present invention will be described in detail with reference to the drawings. The terms 'module' and 'unit' are used to conveniently denote components in the following description, however these terms do not have special meanings or distinguishing roles.

The mobile terminal explained in this description may be a cellular phone, smart phone, laptop computer, digital broadcasting terminal, personal digital assistant (PDA), portable multimedia player (PMP), navigator, and so one.

FIG. 1 is a block diagram of a mobile terminal according to an embodiment of the present invention.

The mobile terminal 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 are essential, and it is possible to implement a mobile terminal with more or fewer components.

Hereinafter, the components will be described one by one.

The radio communication unit 110 may include at least one module that enables radio communication between the mobile terminal 100 and a radio communication system, or between the mobile terminal 100 and a network in which the mobile terminal 100 is located. For example, the radio communication unit 110 may include a broadcast receiving module 111, a mobile communication module 112, a wireless Internet module 113, a local area communication module 114 and a position information module 115.

The broadcast receiving module 111 receives broadcast signals and/or broadcast-related information from an external broadcast management server through a broadcasting channel.

The broadcasting channel may include a satellite channel and a terrestrial channel. The broadcast management server may generate and transmit broadcast signals and/or broadcast-related information, or receive previously created broadcast signals and/or broadcast-related information and transmit the broadcast signals and/or broadcast-related information to a terminal. The broadcast signals may include not only TV broadcast signals, radio broadcast signals and data broadcast signals, but also signals in the form of some combination of a TV broadcast signal or a radio broadcast signal and a data broadcast signal.

The broadcast-related information may be information on a broadcasting channel, a broadcast program or a broadcasting service provider, and may be provided even through a mobile communication network. In the latter case, the broadcast-related information can be received by the mobile communication module 112.

The broadcast-related information may exist in various forms. For example, the broadcast-related information may exist in the form of an electronic program guide (EPG) of the digital multimedia broadcasting (DMB) system or an electronic service guide (ESG) of the digital video broadcast-handheld (DVB-H) system.

The Broadcast receiving module 111 receives broadcast signals using various broadcasting systems. Particularly, the Broadcast receiving module 111 can receive digital broadcast signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) system, etc. The Broadcast receiving module 111 can also be constructed to be suited to broadcasting systems providing broadcast signals other than the above-described digital broadcasting systems.

The broadcast signals and/or broadcast-related information received through the Broadcast receiving module 111 can be stored in the memory 160.

The mobile communication module 112 transmits/receives a radio signal to/from at least one of a base station, an external terminal and a server in a mobile communication network. The radio signal may include a voice call signal, a video telephony call signal or data in various forms according to transmission and reception of text/multimedia messages.

The wireless Internet module 113 corresponds to a module for wireless Internet access and may be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 corresponds to a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. The position information module 115 can acquire position information using a global navigation satellite system (GNSS). Here, GNSS refers to radio navigation satellite systems that orbit the earth and transmit reference signals so that the location of certain types of radio navigation receivers on the earth's surface can be determined or approximated. GNSS includes a global positioning system (GPS) managed by the USA, Galileo managed by Europe, global orbiting navigational satellite system (GLONASS) managed by Russia, COMPASS managed by China, and quasi-zenith satellite system (QZSS) managed by Japan.

As one representative example of GNSS, the position information module 115 may be a GPS module. The GPS module 115 can calculate information on distances between one point (object) and at least three satellites, information on the time when the distance information is measured, and use the obtained distance information to triangulate three-dimensional position information on the point (object) according to latitude, longitude and altitude at a predetermined time. Moreover, a method of calculating position and time information using three satellites and correcting the calculated position and time information using another satellite can also be used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photography mode. Further, the processed image frames can be displayed on a display unit 151.

The image frames processed by the camera 121 can be stored in the memory 160 or transmitted to an external device through the radio communication unit 110. The mobile terminal 100 may include at least two cameras.

The microphone 122 receives an external audio signal in a call mode, a recording mode or a speech recognition mode and processes the received audio signal into electric audio data. The processed audio data can then be converted into a form that can be transmitted to a mobile communication base station through the mobile communication module 112 and output in the call mode. Further, the microphone 122 can employ various noise removal algorithms for removing noise generated when the external audio signal is received.

The user input unit 130 generates input data for controlling the operation of the terminal from a user. The user input unit 130 may include a keypad, a dome switch, a touch pad (constant voltage/capacitance), jog wheel, jog switch and so on.

The sensing unit 140 senses the current state of the mobile terminal 100, such as an open/closed state of the mobile terminal 100, the position of the mobile terminal 100, whether the user touches the mobile terminal 100, the direction of the mobile terminal 100 and the acceleration/deceleration of the mobile terminal 100, and generates a sensing signal for controlling the operation of the mobile terminal 100. For example, the sensing unit 140 can sense whether a slide phone is opened or closed when the mobile terminal 100 is the slide phone. In addition, the sensing unit 140 can sense whether the power supply 190 supplies power and whether the interface 170 is connected to an external device. Meanwhile, the sensing unit 140 may include a proximity sensor.

The output unit 150 generates visual, auditory or tactile output and may include the display unit 151, an audio output module 152, an alarm 153 and a haptic module 154.

The display unit 151 displays information processed by the mobile terminal 100. For example, the display unit 151 displays a user interface (UI) or graphic user interface (GUI) related to a telephone call when the mobile terminal is in the call mode. The display unit 151 also displays a captured and/or received image, UI or GUI when the mobile terminal 100 is in the video telephony mode or the photography mode.

The display unit 151 may include at least one of a liquid crystal display, a thin film transistor liquid crystal display, an organic light-emitting diode display, a flexible display and a three-dimensional display.

Some of these displays may be of a transparent type or a light transmission type so that the user can see the outside through the display. It can be called a transparent display. One representative example of the transparent display is a transparent liquid crystal display (LCD). The rear structure of the display unit 151 may be of the light transmission type. Accordingly, the user can see an object located behind the body of the mobile terminal 100 through the transparent area of the body of the mobile terminal 100, which is occupied by the display unit 151.

The mobile terminal 100 may include at least two display units 151. For example, the mobile terminal 100 may include a plurality of display units that are arranged on a single face separately or integrally. The plurality of display units may be arranged on different sides.

When the display unit 151 and a sensor sensing touch (hereinafter referred to as a touch sensor) form a layered structure hereinafter referred to as a touch screen, the display unit 151 may be used as an input device in addition to an output device. The touch sensor can be in the form of a touch film, a touch sheet and a touch pad, for example.

The touch sensor may be constructed to convert a variation in pressure applied to a specific portion of the display unit 151 or a variation in capacitance generated at a specific portion of the display unit 151 into an electric input signal. The touch sensor may also be constructed to sense pressure of touch as well as the position and area of the touch.

When the user applies touch input to the touch sensor, a signal(s) corresponding to the touch input is transmitted to a touch controller. The touch controller then processes the signal(s) and transmits data corresponding to the processed signal(s) to the controller 180. Accordingly, the controller 180 can detect a touched portion of the display unit 151.

Referring to FIG. 1, the proximity sensor 141 may be located in an internal region of the mobile terminal, surrounded by the touch screen, or near the touch screen. The proximity sensor 141 senses an object approaching a predetermined sensing face or an object located near the proximity sensor using an electromagnetic field or infrared rays without mechanical contact. Further, the proximity sensor 141 has a longer lifespan than a contact sensor and thus has wide-ranging applications.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. The proximity touch position of the pointer on the touch screen is equivalent to a position of the pointer orthogonal to the touch screen when the pointer proximity-touches the touch screen.

The proximity sensor senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

The audio output module 152 can output audio data received from the radio communication unit 110 or stored in the memory 160 in a call signal receiving mode, a telephone call mode or a recording mode, a speech recognition mode, and a broadcast receiving mode. Further, the audio output module 152 outputs audio signals related to functions (for example, a call signal incoming tone, a message incoming tone, etc.) performed in the mobile terminal 100. The audio output module 152 may include a receiver, a speaker, a buzzer, etc. Furthermore, the audio output module 152 can output sound through an earphone jack 116. The user can connect earphones to the earphone jack 116 and hear the output sound.

In addition, the alarm 153 outputs a signal for indicating generation of an event of the mobile terminal 100. For example, events generated in the mobile terminal 100 include receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. One representative example of the haptic effects generated by the haptic module 154 is vibration. The intensity and pattern of vibration generated by the haptic module 154 can also be controlled. For example, different vibrations can be combined and output or sequentially output.

The haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using electrostatic force, and an effect according to reproduction of cold and warmth using an element capable of absorbing or radiating heat in addition to vibration.

The haptic module 154 not only transmits haptic effects through direct contact but also allows the user to feel haptic effects through a kinesthetic sense of the user's fingers or arms. The mobile terminal 100 may include two or more haptic modules 154.

The memory 160 can store a program for operation of the controller 180 and temporarily store input/output data (for example, phone book, messages, still images, moving images, etc.). The memory 160 can also store data about vibrations and sounds in various patterns which are output when a touch input is applied to the touch screen.

The memory 160 may include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface 170 serves as a path to external devices connected to the mobile terminal 100. The interface 170 receives data from the external devices or power and transmits the data or power to the internal components of the mobile terminal 100 or transmits data of the mobile terminal 100 to the external devices. For example, the interface 170 may include a wired/wireless headset port, an external charger port, a wired/wireless data port, a memory card port, a port for connecting a device having an identification module, an audio I/O port, a video I/O port, earphones port, etc.

The identification module is a chip that stores information to authenticate the authority to use the mobile terminal 100. For example, the user identification module may be a user identify module (UIM), a subscriber identify module (SIM) and a universal subscriber identify module (USIM). An identification device including the user identification module may be manufactured in the form of a smart card. Accordingly, the identification device can be connected to the mobile terminal 100 through a port.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

The controller 180 controls overall operation of the mobile terminal. For example, the controller 180 performs control and processing for voice communication, data communication and video telephony. The controller 180 may include a multimedia module 181 for playing multimedia. The multimedia module 181 may be included in the controller 180 or may be separate from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments explained herein can be implemented in a recording medium readable by a computer or the like, using, e.g., software, hardware or a combination thereof.

In the case of hardware implementation, the embodiments explained herein can be implemented using at least one of an application specific integrated circuit (ASIC), digital signal processor (DSP), digital signal processing device (DSPD), programmable logic device (PLD), field programmable gate array (FPGA), processor, controller, micro-controller, microprocessor, and electric unit for executing a function. In some cases, these embodiments can be implemented by the controller 180.

In the case of software implementation, the embodiments such as procedures or functions can be implemented with a separate software module that enables at least one function or task. A software code can be implemented by a software application written in an appropriate programming language. Also, the software code can be stored in the memory 160 and executed by the controller 180.

Figure 2A:
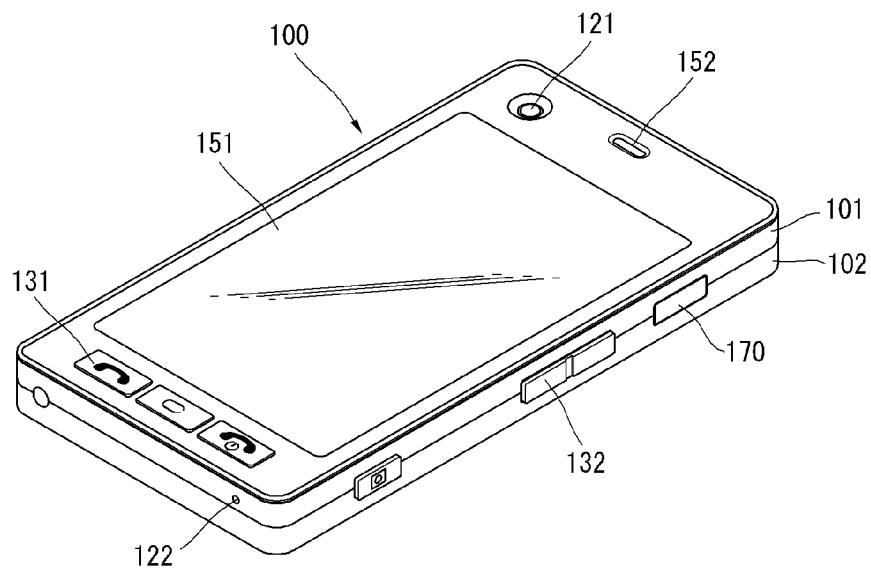
FIG. 2a is a front perspective view of a handheld terminal according to the embodiment of the present invention.

FIG. 2a is a front perspective view of a mobile terminal or a handheld terminal 100 according to an embodiment of the present invention.

In this example, the handheld terminal 100 includes a bar type terminal body. However, the present invention is not limited to a bar type terminal and can be applied to terminals of various types including slide type, folder type, swing type and swivel type terminals in which two or more bodies are coupled to be movable relative to one another.

The terminal body includes a case (a casing, a housing, a cover, etc.) forming the exterior of the terminal 100. In the present embodiment, the case is divided into a front case 101 and a rear case 102. Further, various electronic components are arranged in the space formed between the front case 101 and the rear case 102. At least one middle case may be additionally arranged between the front case 101 and the rear case 102.

The cases may be formed of plastics through injection molding or made of a metal material such as stainless steel (STS) or titanium (Ti).

The display unit 151, the audio output unit 152, the camera 121, user input units 131 and 132, the microphone 122 and the interface 170 are arranged in the terminal body, specifically, in the front case 101.

The display unit 151 occupies most of the main face of the front case 101. The audio output unit 152 and the camera 121 are arranged in a region in proximity to one of both ends of the display unit 151. Also, the user input unit 131 and the microphone 122 are located in a region close to the other end of the display unit 151. The user input unit 132 and the interface 170 are arranged on the sides of the front case 101 and the rear case 102.

The user input unit 130 may include multiple operating units 131 and 132 that are operated to receive commands for controlling operation of the handheld terminal 100. The operating units 131 and 132 can be referred to as manipulation portions and may employ any tactile manner in which the user operates the operating units 131 and 132 while producing a tactile feeling.

The first and second operating units 131 and 132 can receive various inputs. For example, the first operating unit 131 receives commands such as start, end and scroll, and the second operating unit 132 receives commands such as to control the volume of the sound output from the audio output unit 152 or to convert the display unit 151 into a touch recognition mode.

Figure 2B:
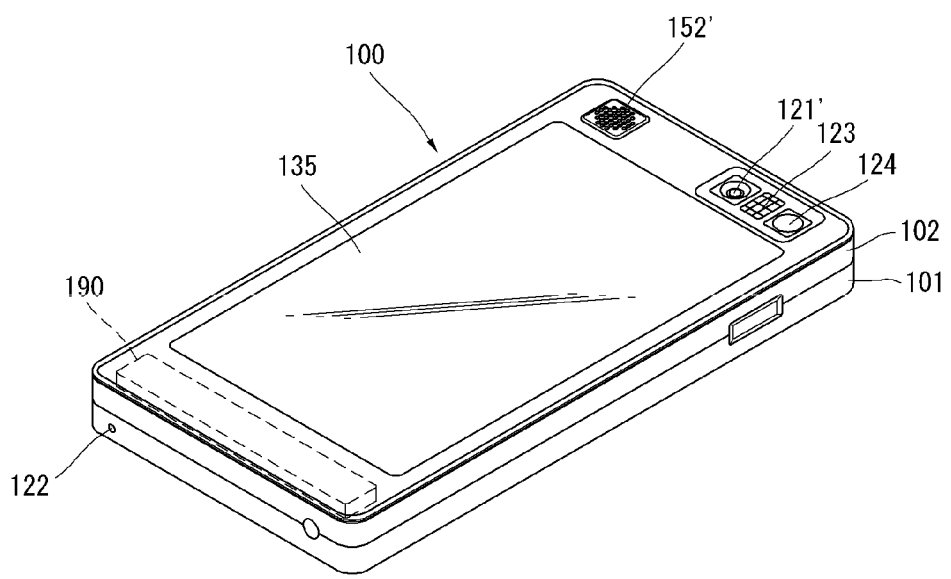
FIG. 2b is a rear perspective view of the handheld terminal according to the embodiment of the present invention.

FIG. 2b is a rear perspective view of the handheld terminal shown in FIG. 2a.

As shown in FIG. 2b, a camera 121' may be additionally attached to the rear side of the terminal body, that is, the rear case 102. In this configuration, the camera 121' may have a photographing direction that is opposite to that of the camera 121 shown in FIG. 2a, and may have a different number of pixels than the camera 121.

For example, it is preferable that the camera 121 has fewer pixels such that it can capture an image of the face of the user and transmit the image to a receiving part during video telephony, while the camera 121' has more pixels such that it can capture an image of a general object and does not immediately transmit the image in many situations. The cameras 121 and 121' may be attached to the terminal body such that they can be rotated or popped-up.

A flash bulb 123 and a mirror 124 are additionally arranged in proximity to the camera 121'. The flash bulb 123 lights an object when the camera 121' takes a picture of the object, and the mirror 124 is used for the user to look at his or her face when the user wants to take a picture of themselves using the camera 121'.

An audio output unit 152' may be additionally provided on the rear side of the terminal body. The audio output unit 152' can achieve a stereo function with the audio output unit 152 shown in FIG. 2a and be used in a speaker phone mode when the terminal is used for a telephone call.

A broadcast signal receiving antenna may be additionally attached to a side of the terminal body in addition to an antenna for telephone calls. The antenna 124 forming a part of the Broadcast receiving module 111 shown in FIG. 1 can be set in the terminal body such that the antenna can be pulled out of the terminal body.

The power supply 190 for providing power to the handheld terminal 100 is set in the terminal body, and may be included in the terminal body or detachably attached to the terminal body.

A touch pad 135 for sensing touch may be additionally mounted on the rear case 102. The touch pad 135 may be a light transmission type like the display unit 151. In this instance, when the display unit 151 outputs visual information through both sides, the visual information can be recognized through the touch pad 135. The information output through both sides of the display unit 151 can be controlled by the touch pad 135. Alternatively, a display can be additionally attached to the touch pad 135 such that a touch screen can be arranged even in the rear case 102.

The touch pad 135 operates in connection with the display unit 151 of the front case 101, and may be located in parallel with the display unit 151 behind the display unit 151. The touch panel 135 may be identical to or smaller than the display unit 151 in size.

Interoperations of the display unit 151 and the touch pad 135 will now be described with reference to FIGS. 3a and 3b.

Figure 3A:
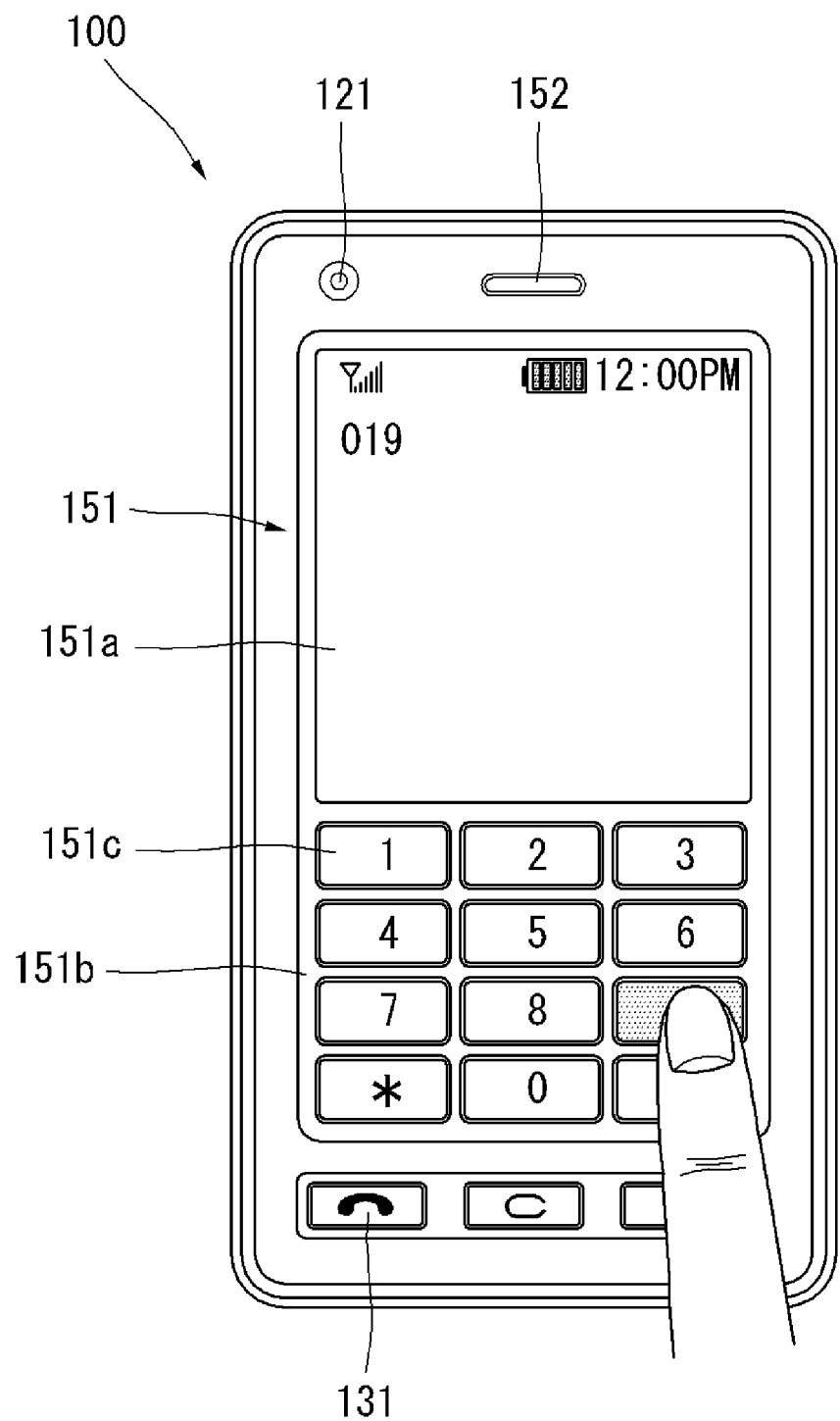
FIGS. 3a and 3b are front views of the handheld terminal which are used to explain an operating state of the handheld terminal according to the present invention.
Figure 3B:
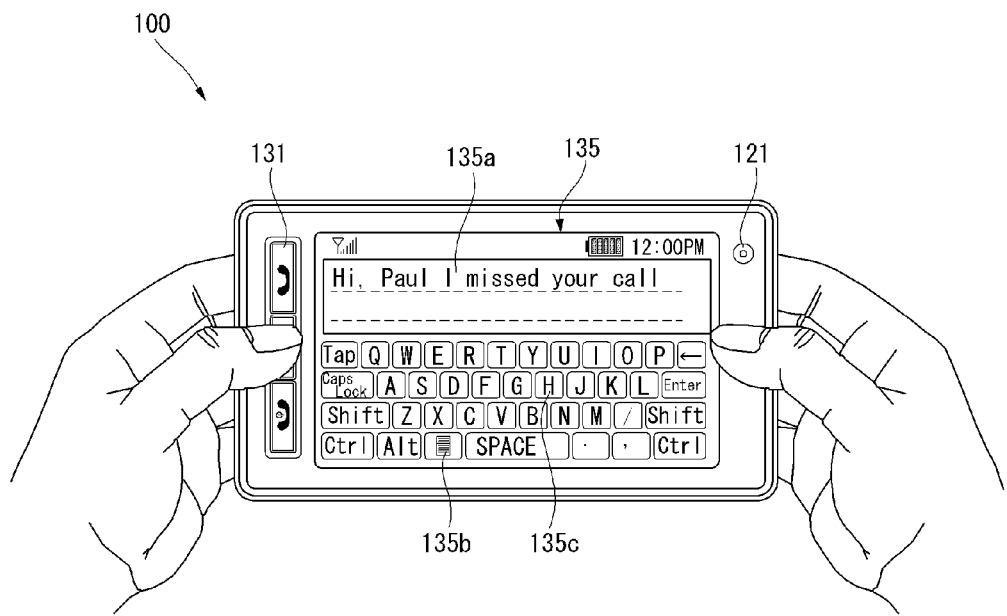

FIGS. 3a and 3b are front views of the handheld terminal 100 for explaining an operating state of the handheld terminal according to the present invention.

The display unit 151 can display various types of visual information in the form of characters, numerals, symbols, graphics or icons.

To input the information, at least one of the characters, numerals, symbols, graphics and icons is displayed in predetermined arrangement in the form of a keypad. The keypad can be referred to as a 'soft keypad'.

FIG. 3a shows that touch applied to a soft key is input through the front side of the terminal body.

The display unit 151 may operate in the entire region or separately in a plurality of regions. In the latter instance, the display unit 151 is constructed such that the plurality of regions interoperate with each other.

For example, an output region 151a and an input region 151b are respectively displayed in upper and lower parts of the display unit 151. The input region 151b displays soft keys 151c that represent numerals used to input numbers such as telephone numbers. Thus, when the soft key 151c is touched, a numeral corresponding to the touched soft key is displayed on the output region 151a. When the user operates the first operating unit 131, a call is placed to the telephone number displayed on the output region 151a.

FIG. 3b shows that touch applied to soft keys is input through the rear side of the terminal body. FIG. 3b shows the landscape of the terminal body while FIG. 3a shows the portrait of the terminal body. The display unit 151 may be constructed such that an output image is converted according to the direction in which the terminal body is located.

FIG. 3b shows operation of the handheld terminal in a text input mode. The display unit 151 displays an output window 135a and an input window 135b. A plurality of soft keys 135c indicating at least one of characters, symbols and numerals are arranged in the input window 135b. The soft keys 135c may be arranged in the form of QWERTY keys.

When the soft keys 135c are touched through the touch pad 135, the characters, numerals and symbols corresponding to the touched soft keys 135c are displayed on the output window 135a. Touch input through the touch pad 135 can prevent the soft keys 135c from being covered with the user's fingers when they are touched as compared to touch input through the display unit 151. When the display unit 151 and the touch pad 135 are transparent, the user can see his or her fingers located behind the terminal body, and thus can apply touch input accurately.

In addition to the input techniques mentioned in the above embodiments, the display unit 151 or the touch pad 135 may be constructed to receive touch input by scrolling. The user can scroll the display unit 151 or the touch pad 135 to move an object displayed on the display unit 151, for example, by using a cursor or a pointer located on an icon. Also, when the user moves his or her finger on the display unit 151 or the touch pad 135, a path of the user's finger can be visually displayed on the display unit 151. This is useful in editing images displayed on the display unit 151.

When the display unit 151 (touch screen) and the touch pad 135 are simultaneously touched within a predetermined period of time, a specific function of the terminal can be executed. For example, the user may clamp the terminal body using their thumb and index finger. This specific function can include activating or deactivating the display unit 151 or the touch pad 135, for example.

The proximity sensor 141 described with reference to FIG. 1 will now be explained in more detail with reference to FIG. 4.

Figure 4:
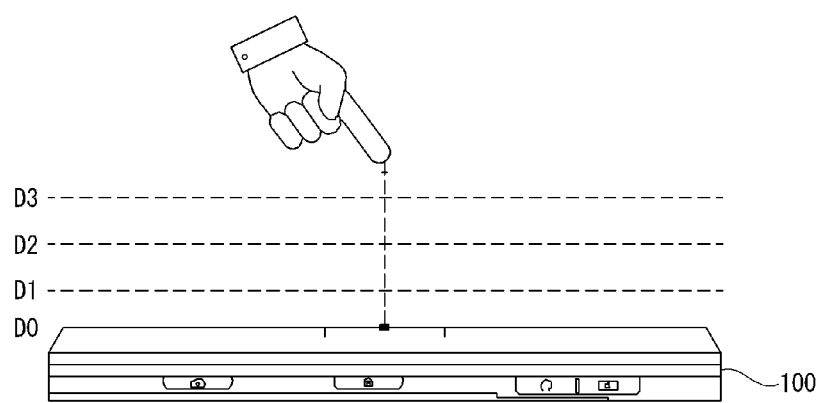
FIG. 4 is a conceptual diagram used to explain a proximity depth of a proximity sensor.

FIG. 4 is a conceptual diagram used for explaining a proximity depth of the proximity sensor 141.

As shown in FIG. 4, when a pointer such as a user's finger approaches the touch screen, the proximity sensor 141 located inside or near the touch screen senses the approach and outputs a proximity signal.

The proximity sensor 141 may be constructed such that it outputs different proximity signals according to the distance between the pointer approaching the touch screen and the touch screen (referred to as "proximity depth").

The distance at which the proximity signal is output when the pointer approaches the touch screen is referred to as a detection distance. The proximity depth can be determined using a plurality of proximity sensors having different detection distances and comparing proximity signals respectively output from the proximity sensors.

FIG. 4 shows the section of the touch screen in which proximity sensors capable of sensing three proximity depths are arranged. Of course, proximity sensors capable of sensing less than three or more than three proximity depths can be arranged in the touch screen.

More specifically, when the pointer completely comes into contact with the touch screen (DO), the controller 180 recognizes this action as the contact touch. When the pointer is located within a distance D1 from the touch screen, the controller 180 recognizes this action as a proximity touch of a first proximity depth. When the pointer is located between the distance D1 and a distance D2 from the touch screen, the controller 180 recognizes this action as a proximity touch of a second proximity depth. When the pointer is located between the distance D2 and a distance D3 from the touch screen, the controller 180 recognizes this action as a proximity touch of a third proximity depth. Also, when the pointer is located over the distance D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen, and perform various operation controls according to the input signals.

Hereinafter, exemplary embodiments of the present invention will be described. In the following description, for convenience of explanation, it is assumed that the display unit 151 shown in the attached drawing is a touch screen 151. As described above, the touch screen 151 can perform both an information display function and an information input function. However, it should be recognized that the present invention is not limited thereto.

Figure 5A:
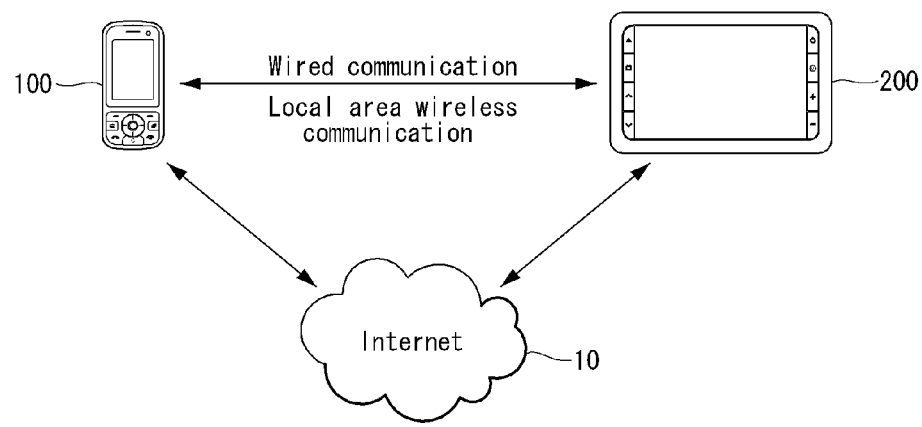
FIGS. 5a and 5b illustrate an example of an environment in which the embodiments of the present invention are applicable.
Figure 5B:
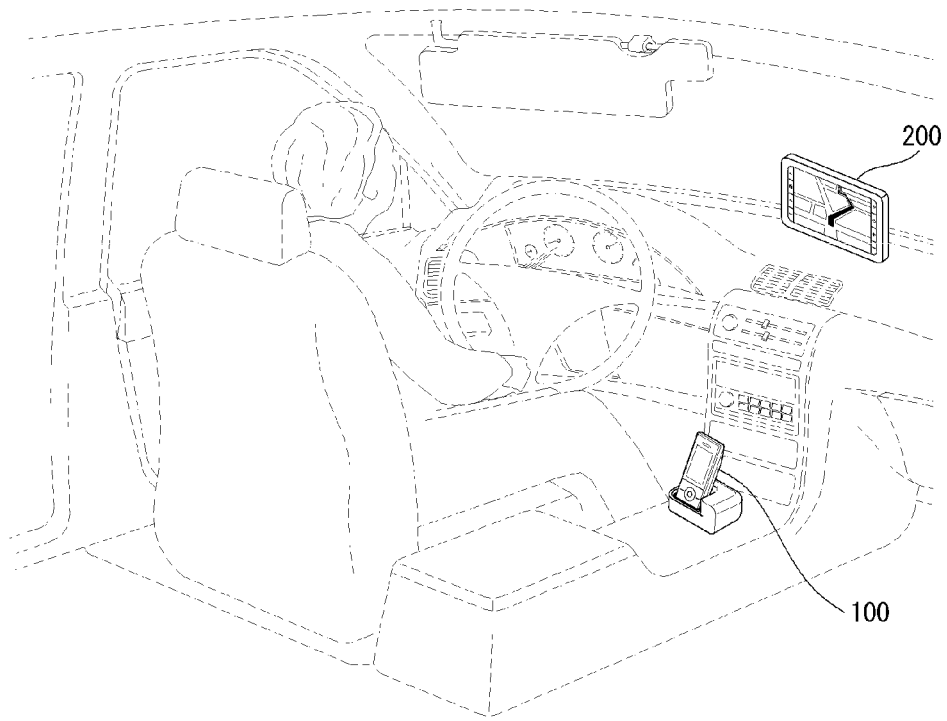

FIGS. 5a and 5b illustrate an example of an environment in which the embodiments of the present invention are applicable. Referring to FIG. 5a, the environment in which the embodiments of the present invention are applicable may include a first mobile terminal 100 and a second mobile terminal 200. The first mobile terminal 100 and the second mobile terminal 200 may include the components of the mobile terminal explained with reference to FIGS. 1 to 4. In addition, the first mobile terminal 100 and the second mobile terminal 200 may not include some of the components of the mobile terminal explained with reference to FIGS. 1 to 4.

The first mobile terminal 100 and the second mobile terminal 200 can communicate with each other in various methods. For example, the first mobile terminal 100 and the second mobile terminal 200 may transmit and receive data through a local area wireless communication system, the Internet 10, or a mobile communication network (not shown). In addition, for example, the first mobile terminal 100 and the second mobile terminal 200 may be connected through a cable to communicate with each other.

As described with reference to FIGS. 1 to 4, the first and second mobile terminals 100 and 200 may provide various functions. Hereinafter, it is assumed that the first mobile terminal 100 is a terminal essentially providing a mobile communication function like a cellular phone, and that the second mobile terminal 200 is a terminal essentially providing a navigation function using a navigation satellite system like a navigator. It is obvious that the first and second mobile terminals 100 and 200 are not limited to the assumed terminals. Such an assumption is intended for convenience of explanation.

FIG. 5b shows circumstances in which the first mobile terminal 100 and the second mobile terminal 200 can be used in actual life. Referring to FIG. 5b, the first mobile terminal 100 and the second mobile terminal 200 can exist in the same vehicle.

The following embodiments will be explained mainly in connection with the first mobile terminal 100, and sometimes in connection with the second mobile terminal 200, as needed. The embodiments described below can be applied to the second mobile terminal 200 in the same manner.

Figure 6:
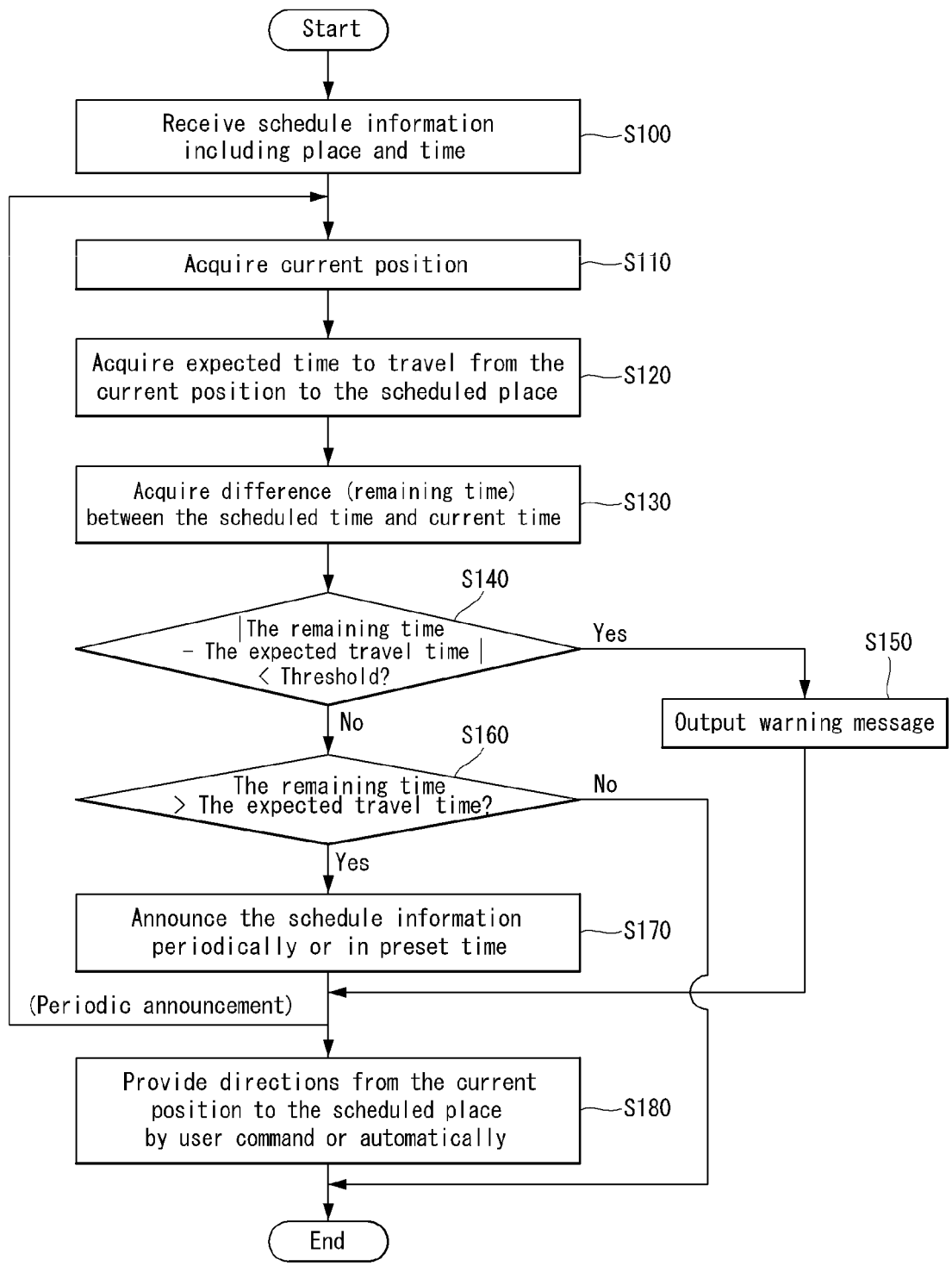
FIG. 6 is a flowchart of a method of managing a schedule using a mobile terminal according to a first embodiment of the present invention.

FIG. 6 is a flowchart of a method of managing a schedule using a mobile terminal according to a first embodiment of the present invention. The method of managing the schedule using the mobile terminal according to the first embodiment of the present invention can be implemented in the first mobile terminal 100 or the second mobile terminal 200 explained with reference to FIGS. 1 to 4. The method of managing the schedule using the mobile terminal according to the first embodiment of the present invention and operations of the mobile terminals 100 and 200 for implementing the same will be described in detail below with reference to FIG. 6 and other necessary drawings.

The controller 180 receives schedule information including a scheduled place and a scheduled time (step S100). The schedule information may further include at least one of scheduled contents, a schedule title and a schedule priority, in addition to the scheduled place and the scheduled time.

In the above step S100, the schedule information can be input from the user through the user input unit 130, or received from the outside through the radio communication unit 110. For example, the user can input the schedule information through a scheduler provided in the first mobile terminal 100. Moreover, for example, the first mobile terminal 100 can receive the schedule information from the second mobile terminal 200 through the network such as the local area wireless communication system or the Internet.

Figure 7A:
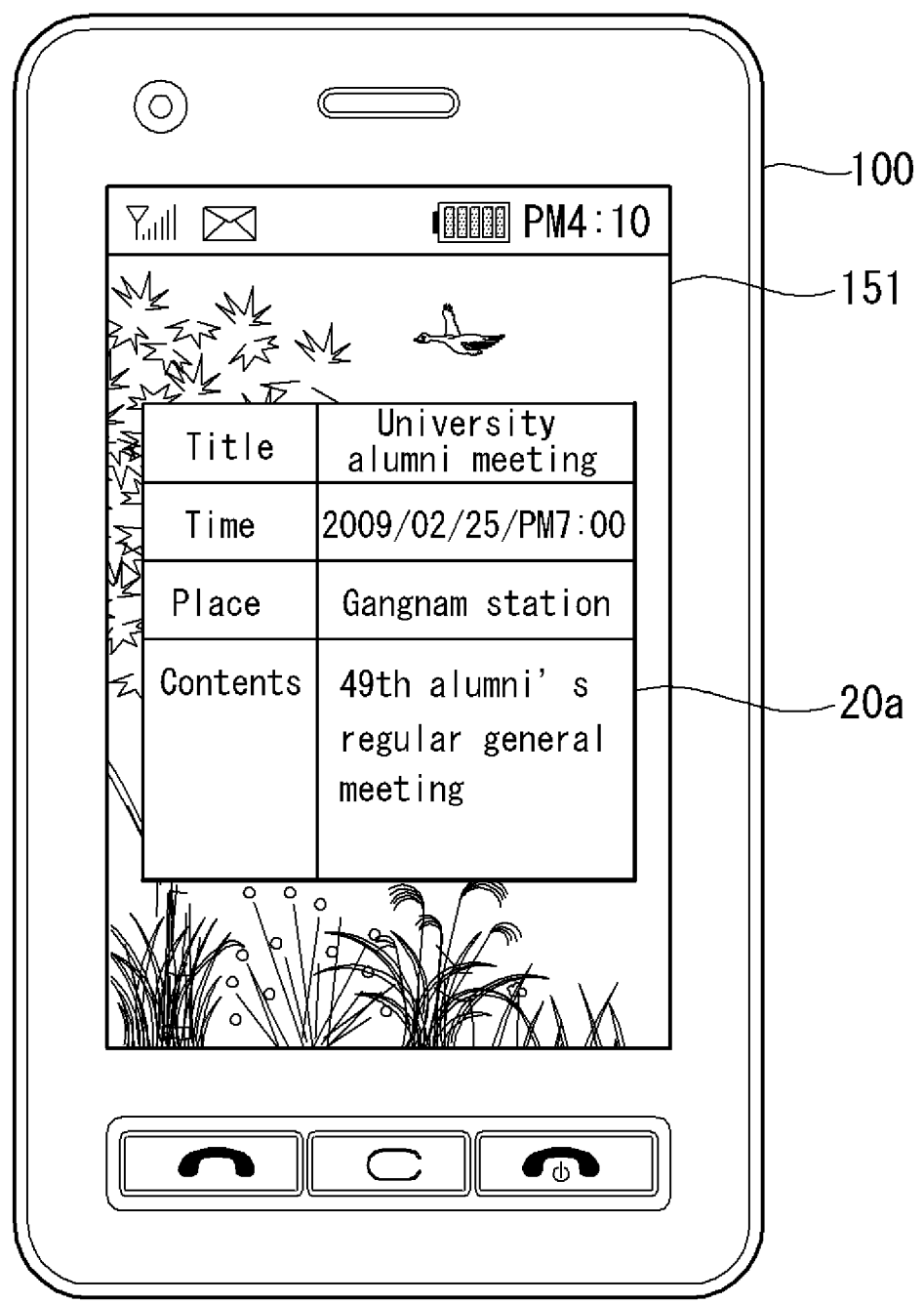
FIGS. 7a and 7b illustrate examples in which received schedule information is displayed on a display unit.
Figure 7B:
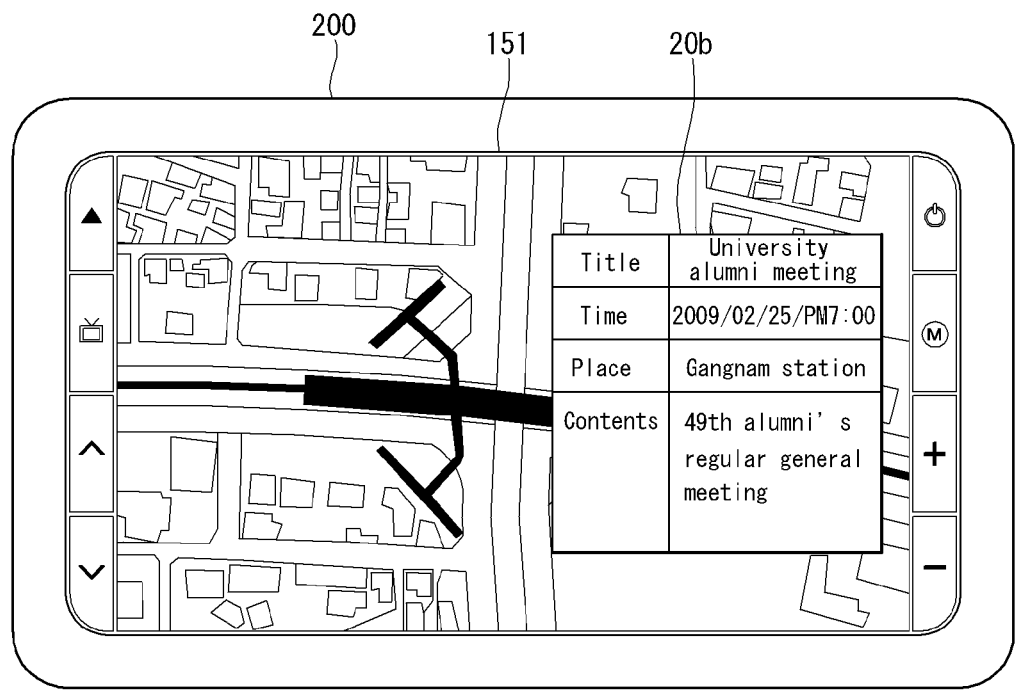

The controller 180 can display the schedule information received in step S100 on the display unit 151. FIGS. 7a and 7b illustrate examples in which the received schedule information is displayed on the display unit 151. FIG. 7a shows an example in which the received schedule information 20a is displayed on the first mobile terminal 100, and FIG. 7b shows an example in which the received schedule information 20b is displayed on the second mobile terminal 200.

The controller 180 acquires information on a current position of the first mobile terminal 100 (step S110). The controller 180 can acquire the current position information using the position information module 115. The position information module 115 can acquire the current position information using the navigation satellite system.

The controller 180 acquires an expected time to travel from the current position acquired in step S110 to the scheduled place included in the received schedule information (step S120), and acquires a remaining time which is a difference between the scheduled time included in the schedule information and a current time (step S130).

Figure 8:
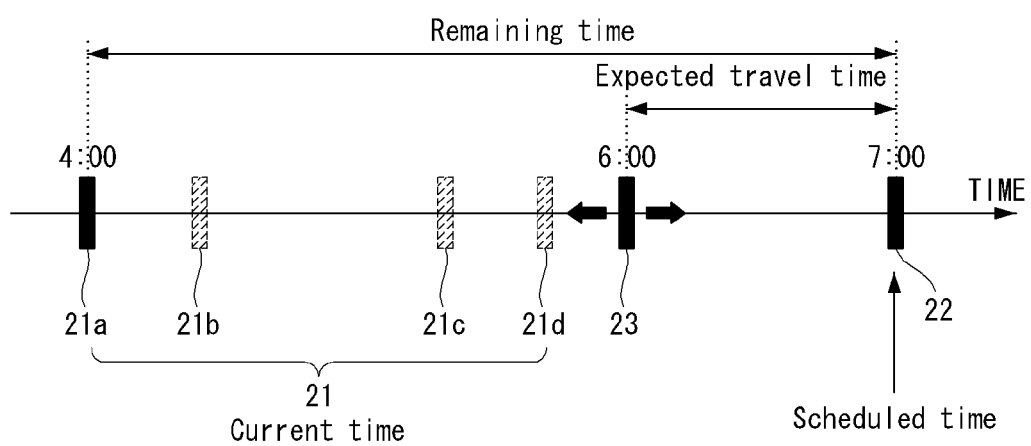
FIG. 8 is a diagram used to explain an expected travel time and a remaining time.

FIG. 8 is a diagram used to explain the expected travel time and the remaining time. Referring to FIG. 8, as far as the user does not change the scheduled time 22, it never changes. The current time 21, the expected travel time and the remaining time have values that change over time.

The expected travel time can be acquired in consideration of the current position acquired in step S110 and road information included in a map stored in the memory 160. In addition, the expected travel time can be acquired further considering traffic situation information. The traffic situation information may be received in real time or may have been stored in the memory 160. When the traffic situation information is received in real time, it can be received through various communication channels. For example, the traffic situation information can be received in real time pursuant to the transport protocol experts group (TPEG). When the traffic situation information has been stored in the memory 160, it may be statistical data about the traffic situation information for a certain period of time.

Referring to FIG. 8, as the current time 21 passes through 21a point, 21b point and 21c point over time, the current position of the first mobile terminal 100 may change. As the current position of the first mobile terminal 100 changes, the expected travel time also changes. In addition, regardless of the change of the current position of the first mobile terminal 100, as the current time 21 changes, the traffic situation information may change. Accordingly, when the expected travel time is acquired reflecting the traffic situation information, the expected travel time may change with as the current time 21 changes.

The controller 180 judges whether an absolute value of the difference between the remaining time and the expected travel time is smaller than a threshold value (step S140).

As a judgment result of step S140, when the absolute value is smaller than the threshold value, the controller 180 can output a warning message (step S150). When the absolute value of the difference between the remaining time and the expected travel time is smaller than the threshold value, it means that if the user departs from the current position for the scheduled place, he/she can arrive in the scheduled time. For example, in FIG. 8, it is when the current time 21 corresponds to 21d point.

Figure 9A:
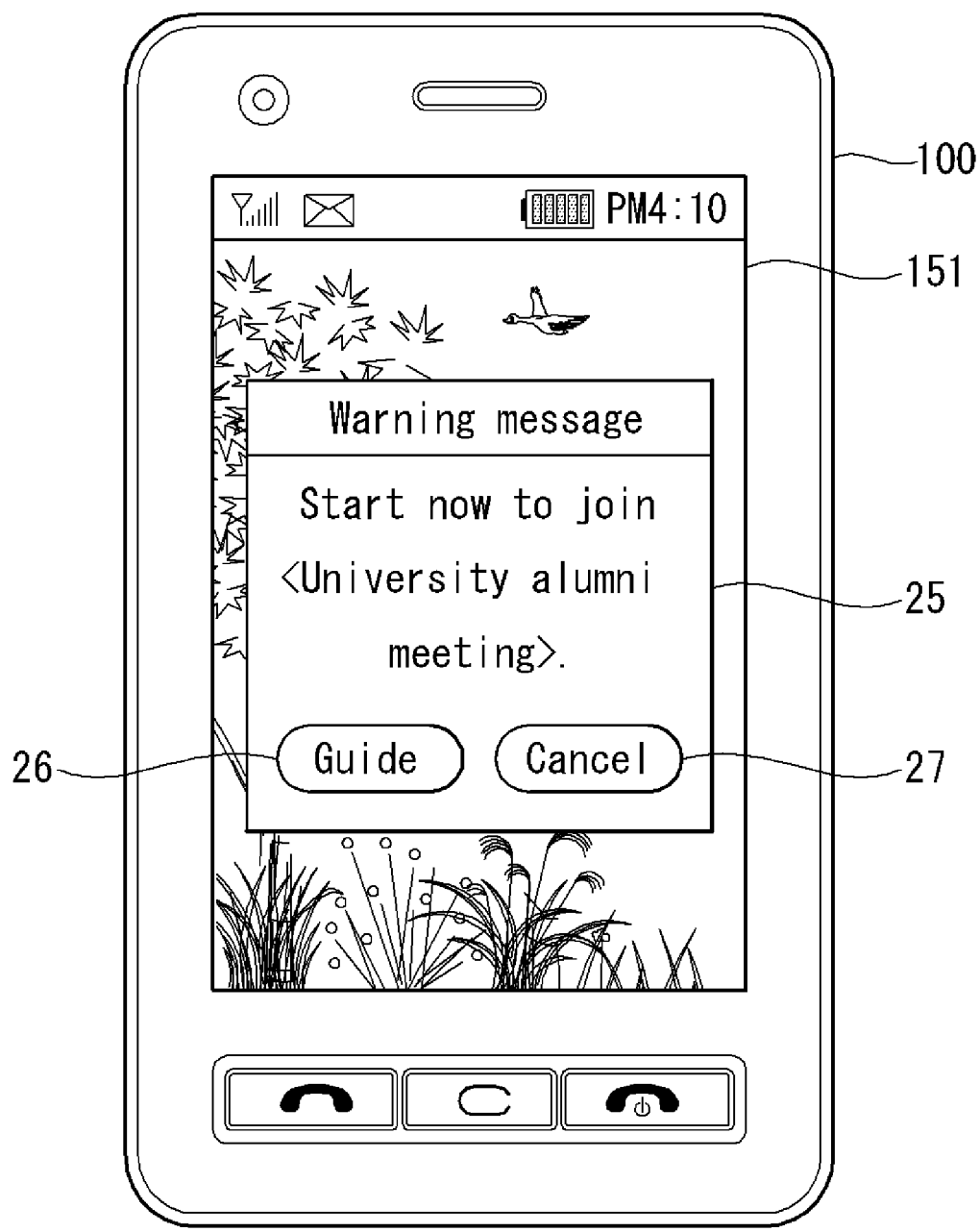
FIG. 9a illustrates an example in which a warning message is displayed on the display unit.

The warning message may be output in various forms. For example, the controller 180 may output the warning message through the audio output module 152 in the form of sound, display the warning message on the display unit 151, or output the warning message through the haptic module 154 in the form of vibration. FIG. 9a shows an example in which the warning message is displayed on the display unit 151. For example, the controller 180 can display the warning message on the display unit 151 in the form of a popup window 25.

As a judgment result of step S140, when the absolute value is not smaller than the threshold value, the controller 180 judges whether the remaining time is larger than the expected travel time (step S160).

As a judgment result of step S160, when the remaining time is larger than the expected travel time, the controller 180 can announce the schedule information to the user periodically or at a preset time (step S170). For example, in FIG. 8, it is when the current time 21 corresponds to a time between 21a point and 21d point.

In step S170, the preset time may be a specific time before the expected travel time and the remaining time become the same.

Figure 9B:
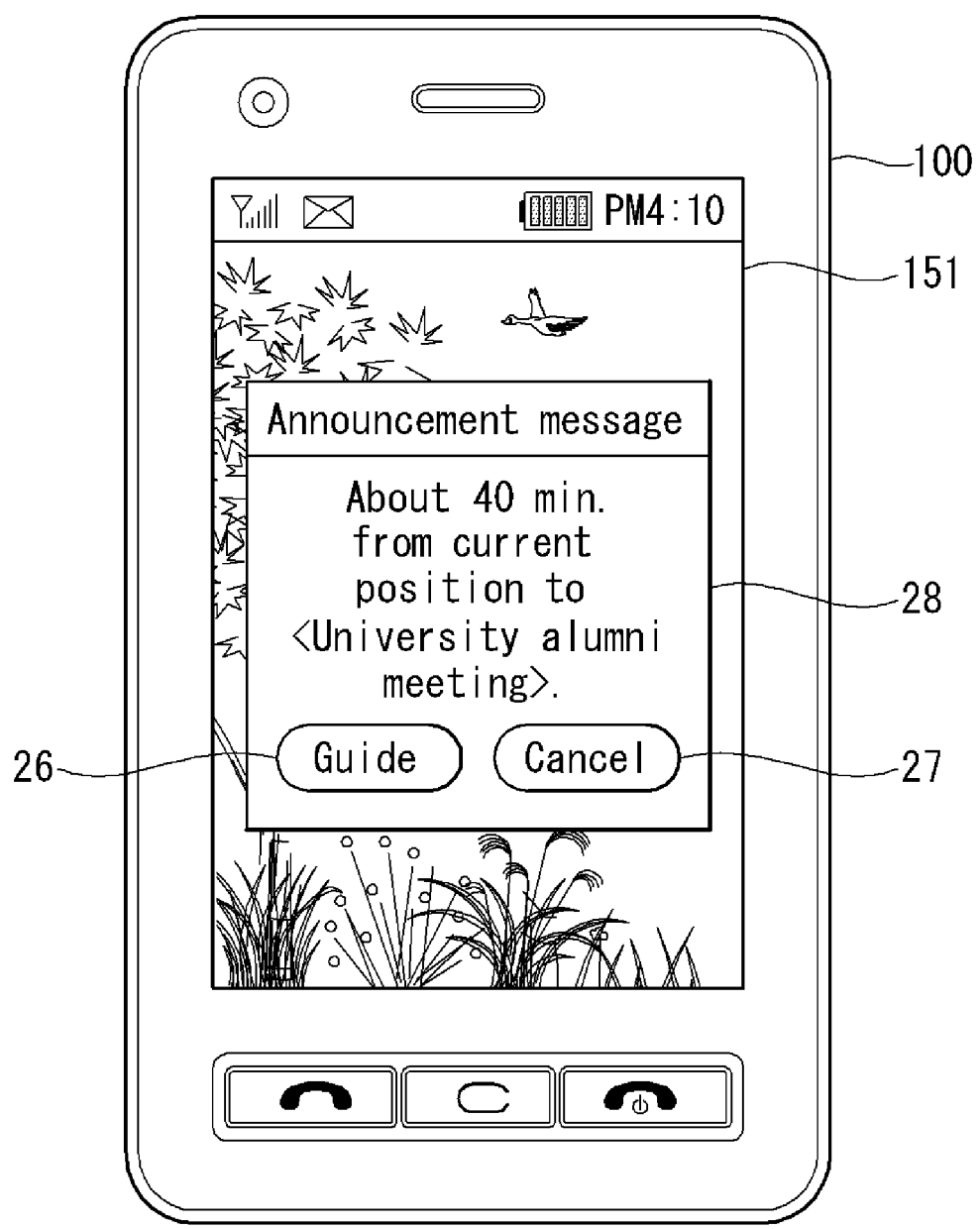
FIG. 9b illustrates an example in which step S170 is performed.

Like step S150, the controller 180 can perform step S170 in various manners. FIG. 9b illustrates an example in which step S170 is performed. For example, referring to FIG. 9b, the controller 180 can announce the schedule information to the user in the form of a popup window 28. The popup window 28 shown in FIG. 9b may include contents about how long it takes to travel from the current position to the scheduled place.

When the controller 180 is set to periodically announce the schedule information, it may return to step S110 to repeat the aforementioned processes, after performing step S170.

After performing step S150 or S170, the controller 180 can provide directions from the current position to the scheduled place by the user's command or automatically (step S180).

For example, the controller 180 can provide the popup window 25 shown in FIG. 9a and the popup window 28 shown in FIG. 9b with a guide button 26 for activating directions, and a cancel button 27 for removing the popup windows 25 and 28 from the screen. The user can be informed of the path of travel from the current position to the scheduled place by selecting the guide button 26.

Moreover, in FIGS. 9a and 9b, when the controller 180 does not receive any command from the user, it may provide directions automatically, or may remove the popup windows 25 and 28 from the screen without providing directions. Whether to provide directions automatically may be set differently. For example, when outputting the warning message in FIG. 9a, the controller 180 can be set to provide directions automatically. Meanwhile, when outputting the alarm message in FIG. 9b, the controller 180 can be set to provide directions only upon receipt of a command from the user.

Figure 10A:
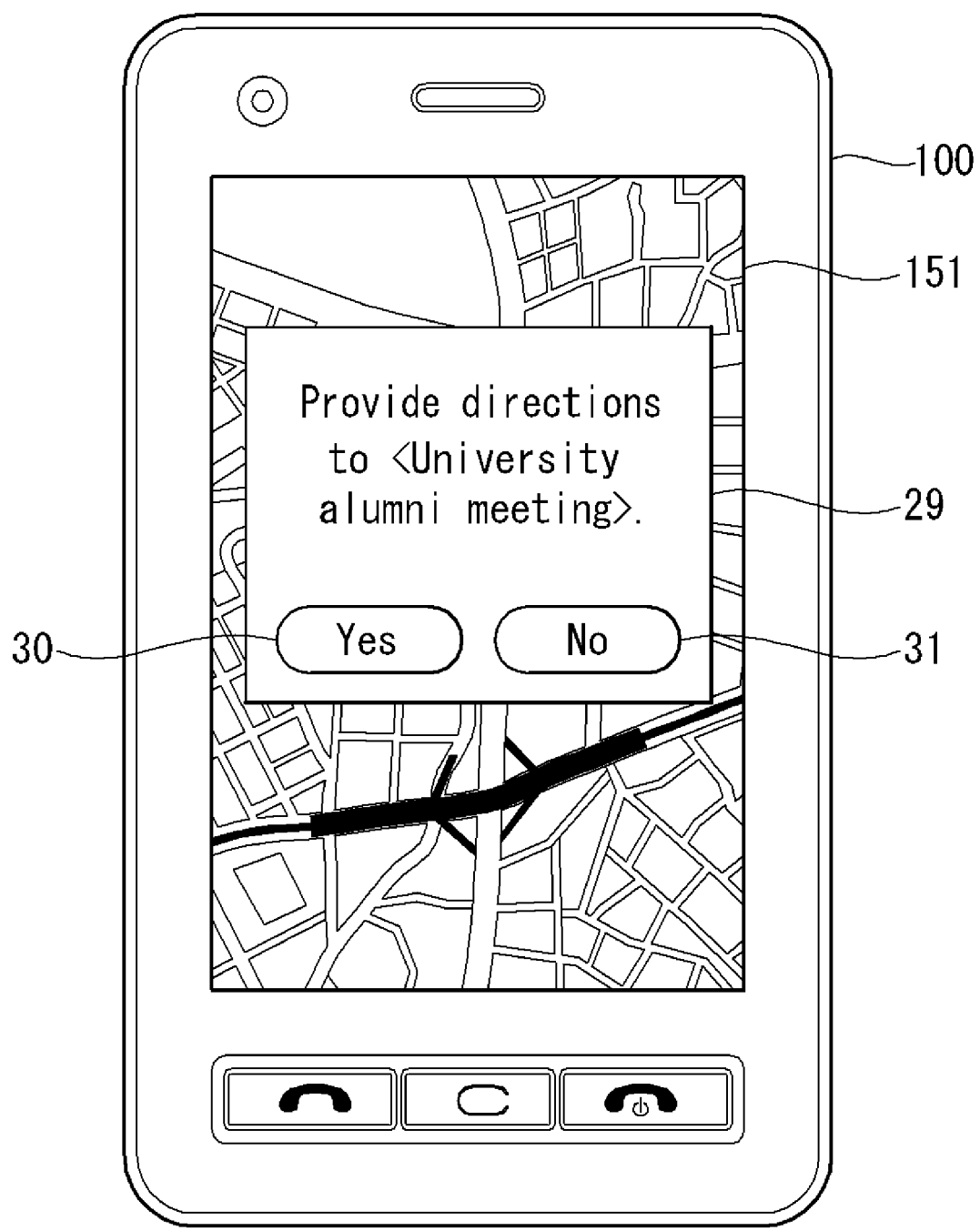
FIGS. 10a and 10b illustrate an example in which step S180 is performed.
Figure 10B:
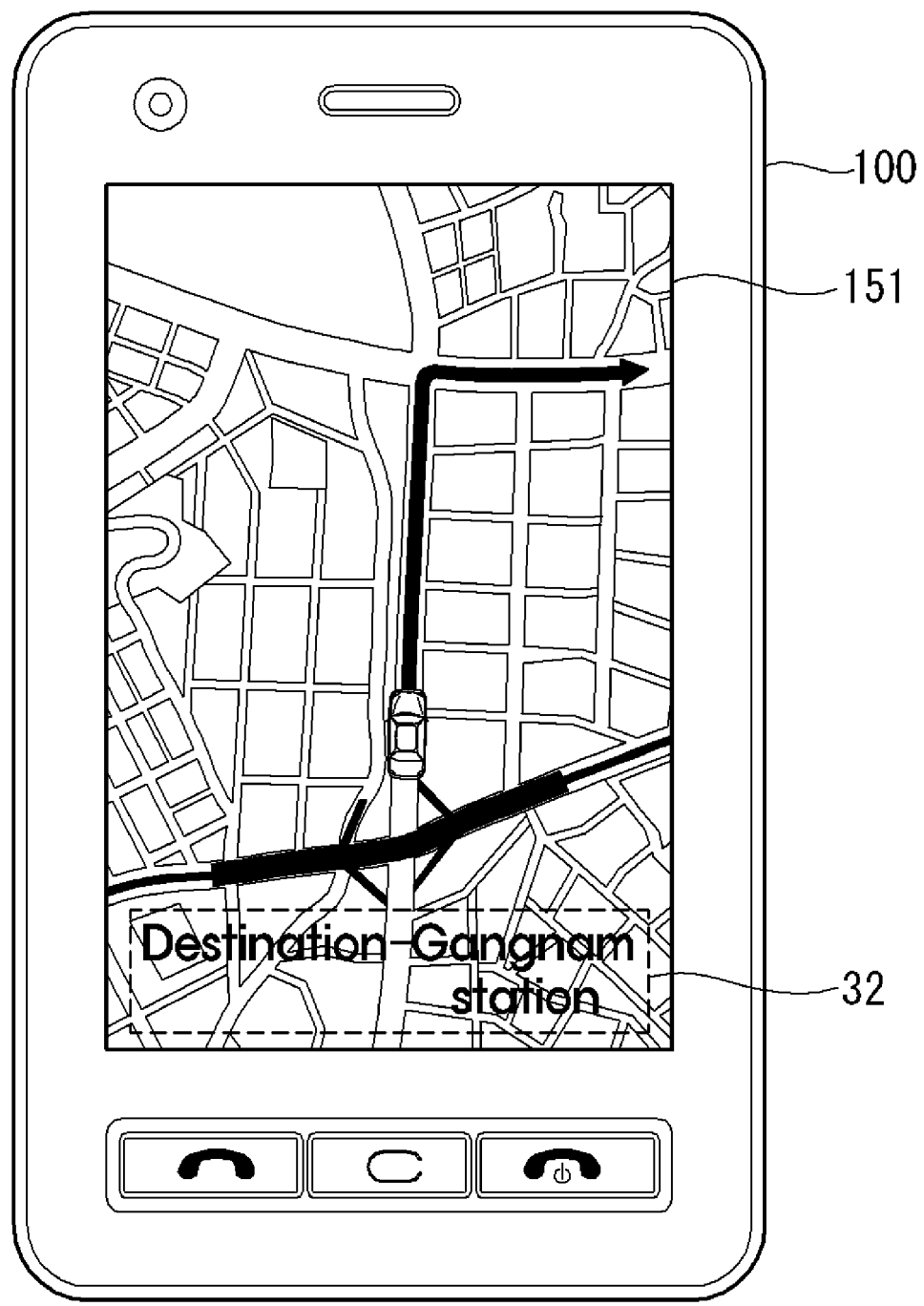

FIGS. 10a and 10b illustrate an example in which step S180 is performed.

When the controller 180 receives a command for activating directions from the user or is set to provide directions automatically, the controller 180 can enter an image shown in FIG. 10a and display a popup window 29 including contents about activating directions on the display unit 151. Here, the user can select either an approval button 30 or a disapproval button 31 provided on the popup window 29. In addition, when the user does not select either the approval button 30 or the disapproval button 31 within a predetermined time, the controller 180 can start to provide directions automatically.

FIG. 10b shows an example of an image providing directions from the current position to the scheduled place 32. The maps shown in FIGS. 10a and 10b may be displayed around the current position. In the meantime, the map shown in FIG. 10a may be displayed around the scheduled place.

FIG. 11 is a flowchart of a method of managing a schedule using a mobile terminal according to a second embodiment of the present invention. The method of managing the schedule using the mobile terminal according to the second embodiment of the present invention can be implemented in the first mobile terminal 100 or the second mobile terminal 200 explained with reference to FIGS. 1 to 4. Hereinafter, the method of managing the schedule using the mobile terminal according to the second embodiment of the present invention and the operations of the mobile terminals 100 and 200 for implementing the same will be described in detail with reference to FIG. 11 and other necessary drawings.

The controller 100 enters a schedule information receiving mode to receive schedule information (step S200). For example, the user can manipulate the user input unit 130 to drive a scheduler provided in the first mobile terminal 100. The scheduler can provide the schedule information receiving mode to receive input of a new schedule item.

Figure 12A:
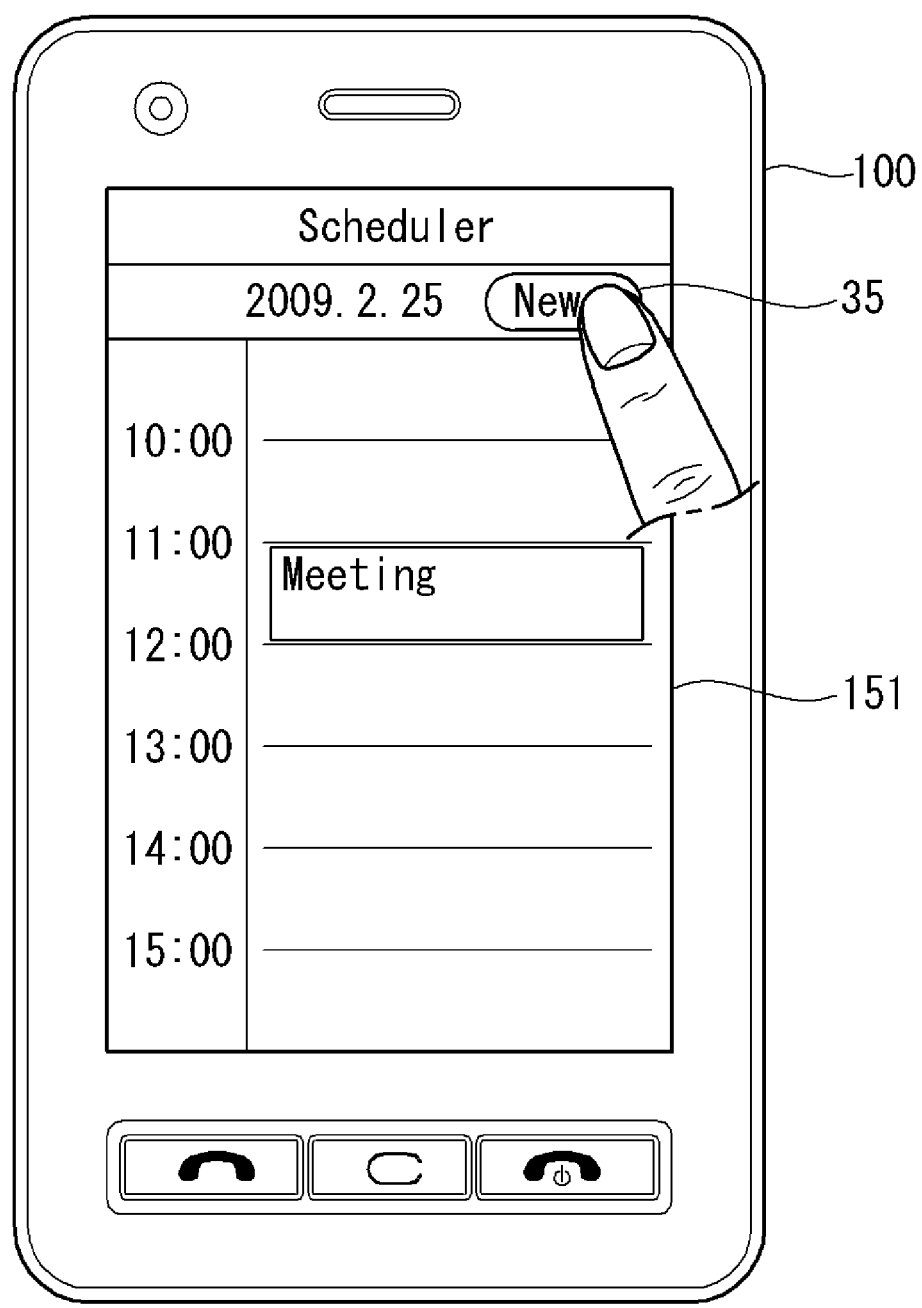
FIG. 12a illustrates an example of an image in which a scheduler is driven.

FIG. 12a illustrates an example of an image in which the scheduler is driven. The scheduler shown in FIG. 12a can provide a button 35 for entering an image for use in receiving input of a new schedule item.

Figure 12B:
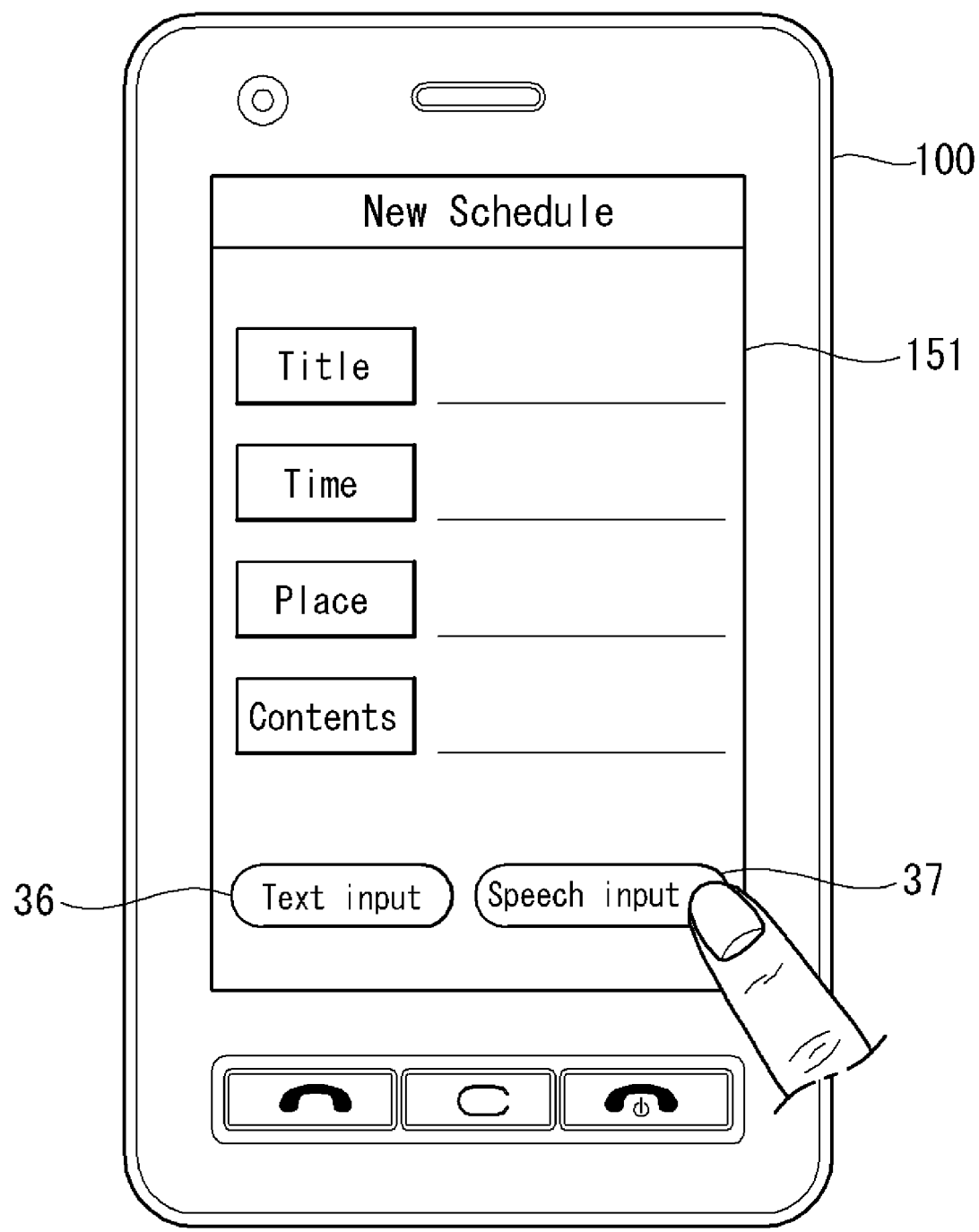
FIG. 12b illustrates an example of an image entering a schedule information receiving mode.

FIG. 12b illustrates an example of an image entering the schedule information receiving mode. For example, the user can enter the schedule information receiving mode shown in FIG. 12b by selecting the button 35 shown in FIG. 12a.

After entering the schedule information receiving mode, the controller 180 can provide a text input mode and a speech input mode.

The text input mode is for receiving input of the schedule information by receiving input of text through the keypad provided in the first mobile terminal 100 or a virtual keypad provided on the display unit 151.

The speech input mode is for receiving the schedule information via an audio signal. The speech input mode can receive the audio signal through the microphone 122.

When the speech input mode is used, the controller 180 can convert the received audio signal into text using a speech recognition algorithm. The speech recognition algorithm may have been stored in the memory 160.

Generally, a technique for converting audio information into text information is called speech to text (STT).

For example, in FIG. 12b, the controller 180 can display a button 36 for entering the text input mode and a button 37 for entering the speech input mode on the display unit 151.

When the user selects the button 37 for entering the speech input mode, the controller 180 enters the mode for receiving the schedule information via speech.

One or more different input methods can be provided in the speech input mode. When entering the speech input mode, the user can set which of the one or more input methods will be activated.

Two speech input modes will be explained below as examples.

Figure 13A:
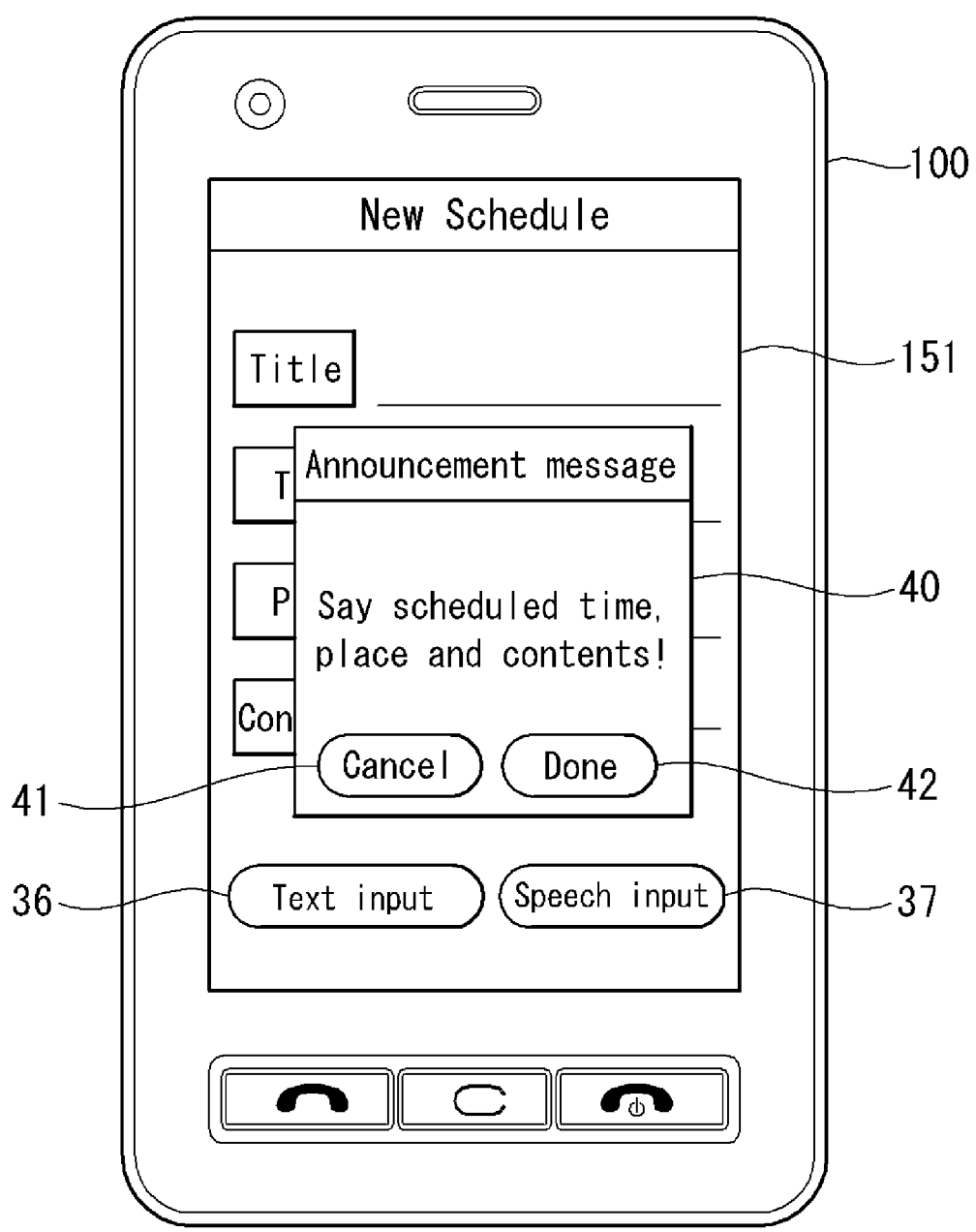
FIG. 13a is a diagram illustrating an example in which a controller provides an announcement message to perform step S230.

The controller 180 judges whether the preset speech input mode is an interaction mode (step S210). As a result of step S210, when the preset speech input mode is not the interaction mode, the controller 180 can receive the schedule information including a scheduled time, a scheduled place and scheduled contents via speech all at once (step S230). FIG. 13a is a diagram illustrating an example in which the controller 180 provides an announcement message 40 to perform step S230.

In a state where the image shown in FIG. 13a is displayed, the user can input the scheduled time, the scheduled place and the scheduled contents via speech all at once, regardless of order. For example, the user can say "the revised patent law of 2009 will be explained at City Hall from 2 to 3 p.m."

The controller 180 converts the speech received in step S230 into text using the speech recognition algorithm (step S240), and extracts the scheduled time, the scheduled place and the scheduled contents from the converted text (step S250).

In the above step S250, the controller 180 applies a context analysis algorithm to the text converted in step S240, to thereby extract the scheduled time, the scheduled place and the scheduled contents, respectively. The context analysis algorithm may use a time context database to extract the scheduled time and a place database to extract the scheduled place. The context analysis algorithm, the time context database and the place database may have been stored in the memory 160.

The time context database is a group of texts indicating time, and the place database is a group of texts indicating a place. Meanwhile, the place database may interoperate with a navigation application or a map application.

For example, the controller 180 can extract 'City Hall' from the converted text as the scheduled place and 'from 2 to 3 p.m.' as the scheduled time. Also, the controller 180 can extract the other context of the converted text, 'Revised patent law of 2009 will be explained' as the scheduled contents.

When the preset speech input mode is the interaction mode, the controller 180 can provide three user interfaces for enquiring about the time, place and contents respectively, and receive the scheduled time, the scheduled place and the scheduled contents via speech through the three user interfaces, respectively (step S220).

The controller 180 can provide the three user interfaces in a predetermined order. The three user interfaces may be visual or auditory. For example, the three user interfaces may be displayed on the display unit 151 or output through the audio output module 152 as audio signals.

Figure 13B:
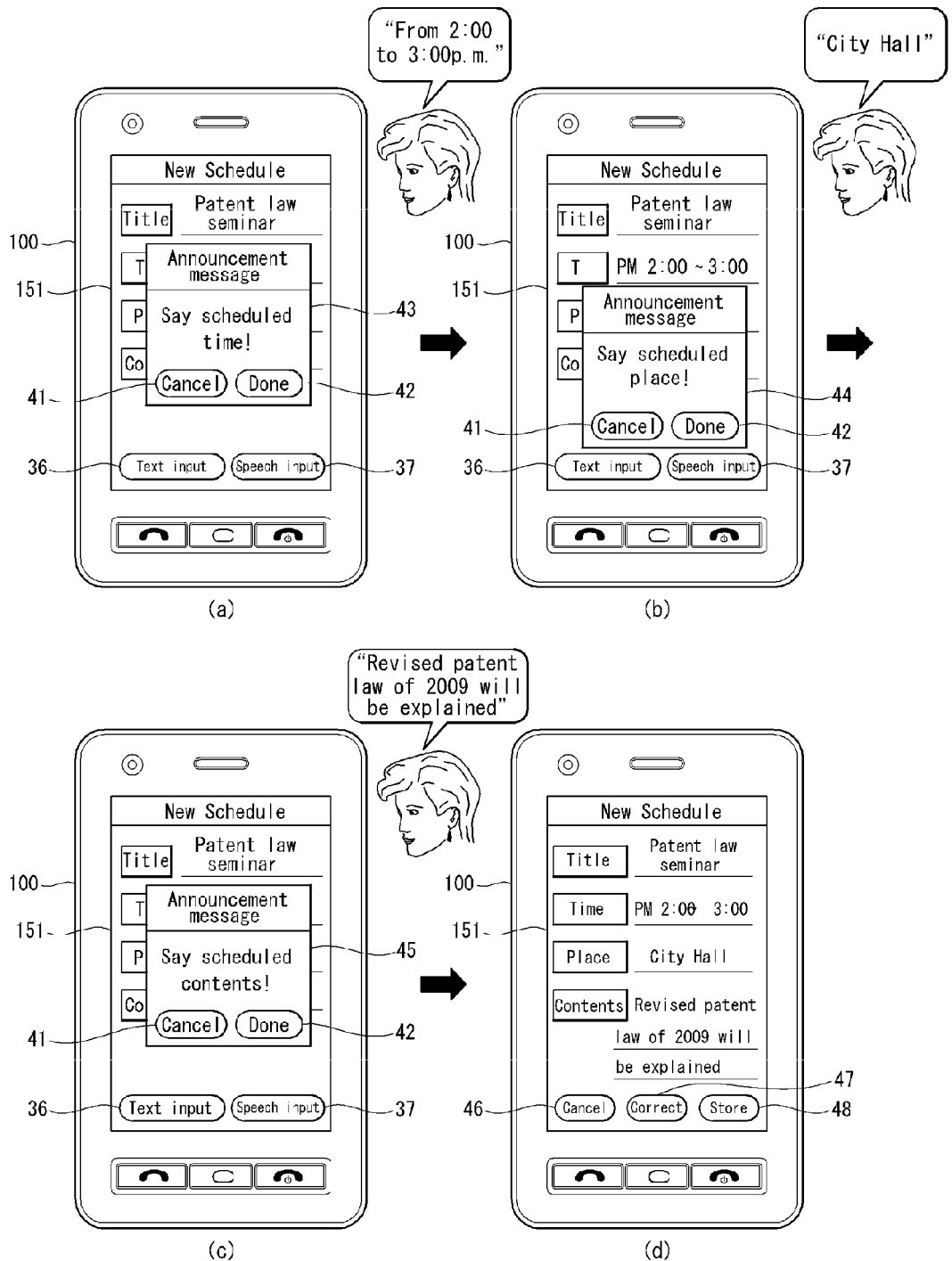
FIG. 13b is a diagram illustrating an example in which a user interoperates with visual user interfaces.

FIG. 13b is a diagram illustrating an example in which the user interoperates with the visual user interfaces.

As illustrated in FIG. 13b(a), the controller 180 can provide a first user interface 43 for enquiring about the scheduled time (step S221), and receive speech from the user through the first user interface 43 (step S222). The controller 180 applies the speech of the user received in step S222 to the scheduled time. In FIG. 13b(a), the user says time information, i.e. 'from 2 to 3 p.m.'

As illustrated in FIG. 13b(b), the controller 180 can provide a second user interface 44 for enquiring about the scheduled place (step S223), and receive speech from the user through the second user interface 44 (step S224). The controller 180 applies the speech of the user received in step S224 to the scheduled place. In FIG. 13b(b), the user says place information, i.e. 'City Hall'.

As illustrated in FIG. 13b(c), the controller 180 can provide a third user interface 45 for enquiring about the scheduled contents (step S225), and receive speech from the user through the third user interface 45 (step S226). The controller 180 applies the speech of the user received in step S226 to the scheduled contents. In FIG. 13b(c), the user speaks information on the scheduled contents, i.e. 'Revised patent law of 2009 will be explained'.

Each process of FIG. 13b may be performed automatically or manually. For example, when the user selects a speech input end button 42 provided in the first, second and third user interfaces 43, 44 and 45, the next process can be carried out.

In addition, for example, when the controller 180 judges that the speech input has been performed in each process, if a predetermined time elapses, the controller 180 can perform the next process without receiving a signal selecting the speech input end button 42. When the controller 180 receives a signal selecting a cancel button 42 shown in FIG. 13b, it can end the speech input mode or return to the previous step.

FIG. 13b illustrates the user interfaces enquiring about the time, place and contents in order, which is nothing but an example. That is, in the second embodiment of the present invention, the order of providing the three user interfaces for enquiring about the time, place and contents is not limited.

The controller 180 can convert the three speech samples received in steps S222, S224 and S226 into text using the speech recognition algorithm (step S240). Here, the three received speech samples may be converted into text all at once after the above steps S221 to S226 are ended. Alternatively, the three speech samples may be converted into text and stored in the memory 160, respectively, whenever received. FIG. 13b shows an example in which the speech of the user is converted into text and recorded in a corresponding field, whenever received. For example, referring to FIG. 13b(b), the information on the 'scheduled time' of the user received in the previous step can be recorded in a corresponding field.

Since the speech samples received from the user in the interaction mode have corresponding features, the controller 180 does not have to analyze the context using the context analysis algorithm. For example, the speech received in step S222 has a feature corresponding to the scheduled time. In addition, for example, the speech received in step S224 has a feature corresponding to the scheduled place. Moreover, for example, the speech received in step S226 has a feature corresponding to the scheduled contents.

Accordingly, the controller 180 can set the speech samples received through the three user interfaces 43, 44 and 45 to be the scheduled time, the scheduled place and the scheduled contents, respectively, according to the corresponding relations (step S250).

The controller 180 can store the schedule information in a schedule management database according to predetermined standards, considering the extracted or set scheduled time, scheduled place and scheduled contents after step S250, regardless of execution of the interaction mode (step S260). The schedule management database can be stored in the memory 160.

FIG. 13b(d) illustrates the schedule information to be stored in the schedule management database. FIG. 13b(d) shows an image that can be output, when the second embodiment of the present invention is implemented, regardless of execution of the interaction mode. The user can confirm whether the contents of his/her speech have been normally recognized in the image of FIG. 13b(d), and select a save button 48. When the user selects the save button 48, the schedule information can be stored in the schedule management database.

The controller 180 can announce the schedule information stored in the schedule management database in consideration of a current time (step S270). The time to announce the schedule information can be set variously. For example, when the current time is one hour before the scheduled time included in the schedule information, the controller 180 can announce the schedule information.

The second embodiment of the present invention can be combined with the first embodiment of the present invention. For example, with respect to the schedule information input by the second embodiment of the present invention, the schedule can be announced and directions for travelling to the scheduled place can be provided by the first embodiment of the present invention.

Figure 14:
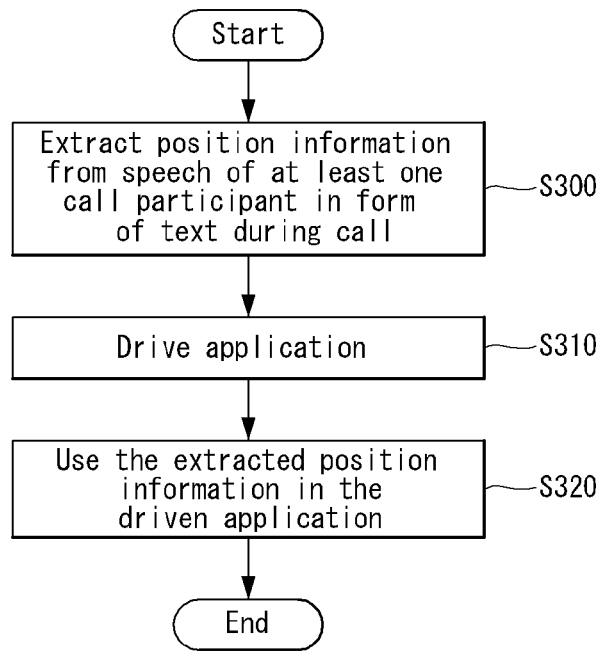
FIG. 14 is a flowchart of a method of managing position information using a mobile terminal according to a third embodiment of the present invention.

FIG. 14 is a flowchart of a method of managing position information using a mobile terminal according to a third embodiment of the present invention. The method of managing the position information using the mobile terminal according to the third embodiment of the present invention can be implemented in the first mobile terminal 100 or the second mobile terminal 200 explained with reference to FIGS. 1 to 4. Hereinafter, the method of managing the position information using the mobile terminal according to the third embodiment of the present invention and operations of the mobile terminals 100 and 200 for implementing the same will be described in detail with reference to FIG. 14 and other necessary drawings.

The controller 180 extracts position information from speech of at least one participant in a call, in the form of text, during the call, using a speech recognition algorithm (step S300).

The controller 180 can perform the call using the mobile communication module 112 or the wireless Internet module 113. The call performed in step S300 may be at least one of a voice call and a video telephony call. Also, at least one participant can participate in the call performed in step S300, besides the user of the first mobile terminal 100 or the second mobile terminal 200. For example, three or more participants can participate in the call.

Figure 15:
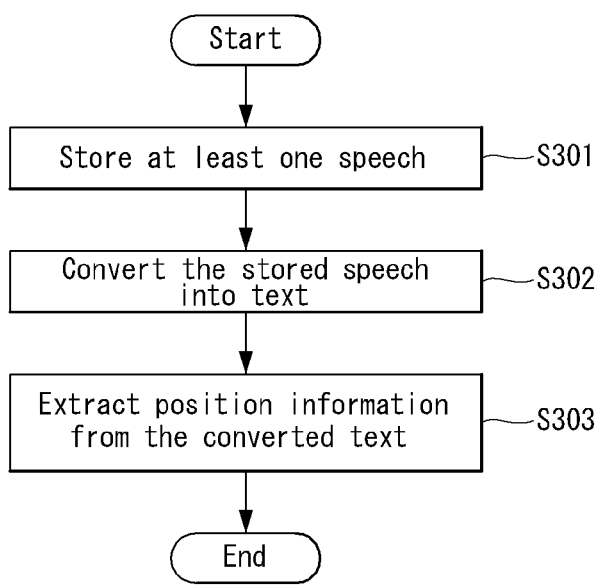
FIG. 15 is a flowchart illustrating an example of a process for performing step S300.

FIG. 15 is a flowchart illustrating an example of a process for performing step S300. An embodiment of the process for performing step S300 will be described in detail with reference to FIG. 15 and other necessary drawings.

Figure 16:
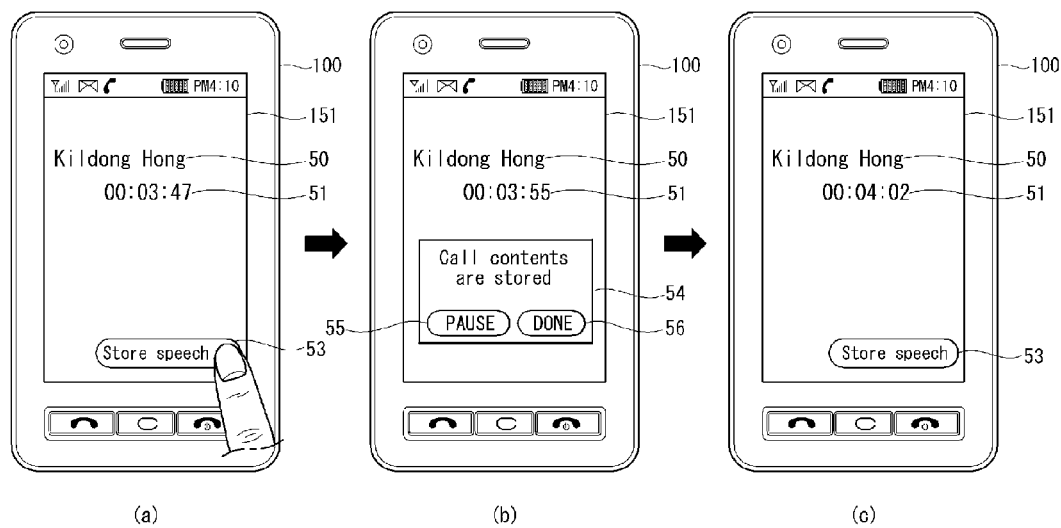
FIG. 16 is a diagram illustrating an example of a process for storing speech during a call.

The controller 180 can store the at least one speech during the call (step S301). FIG. 16 is a diagram illustrating an example of a process for storing the speech during the call. In FIG. 16, reference numeral 50 denotes information on a call receiving part and 51 denotes call duration information.

Referring to FIG. 16(*a*), the user can select a speech save button 53 provided on the display unit 151 during the call. When receiving a signal selecting the speech save button 53, the controller 180 starts to store the speech of at least one of the participants in the call. For another instance, when receiving a signal of a specific key included in the keypad provided in the first mobile terminal 100, the controller 180 can start to store the speech of at least one of the participants in the call. Functions for starting and ending storage of speech during a call may be allocated to the specific key.

Here, the controller 180 may select all the speech samples of the participants in the call, or selectively store them. For example, the controller 180 may provide the display unit 151 with a graphic user interface for selecting at least one of the participants, and receive a signal selecting at least one participant through the graphic user interface. For example, even when the user performs a call with one person, he/she can selectively store his/her speech or the receiving party's speech.

FIG. 16(*b*) illustrates an example of an image in which the current call contents are stored as speech. The controller 180 can provide functions for temporarily stopping and ending the speech storing function while storing the call speech. For example, referring to FIG. 16(*b*), the controller 180 provides the display unit 151 with a pause button 55 allocated with the function for temporarily stopping the speech storing function, and a done button 56 allocated with the function for ending the speech storing function. When the user selects the done button 55, the image is converted into an image of FIG. 16(*c*), and the speech storing function is ended.

The controller 180 can convert the stored speech into text using the speech recognition algorithm (step S302). Step S302 may be performed after the speech storage performed in step S301 is finished or at the same time as step S301. For example, the controller 180 may convert the speech received in step S301 into text at intervals of a certain time (e.g. every 10 seconds) and store the text in the memory 160.

The controller 180 can extract position information from the text converted in step S302 (step S303). As explained in the second embodiment of the present invention, in Step S303, the position information can be extracted using a context analysis algorithm. The context analysis algorithm can use the place database explained in the second embodiment of the present invention. In step S303, the controller 180 can extract one or more pieces of position information.

The controller 180 can drive any one of one or more applications capable of using the position information extracted in step S300 (step S310). The application driven in step S310 may be selected by the user or designated in advance.

Figure 17:
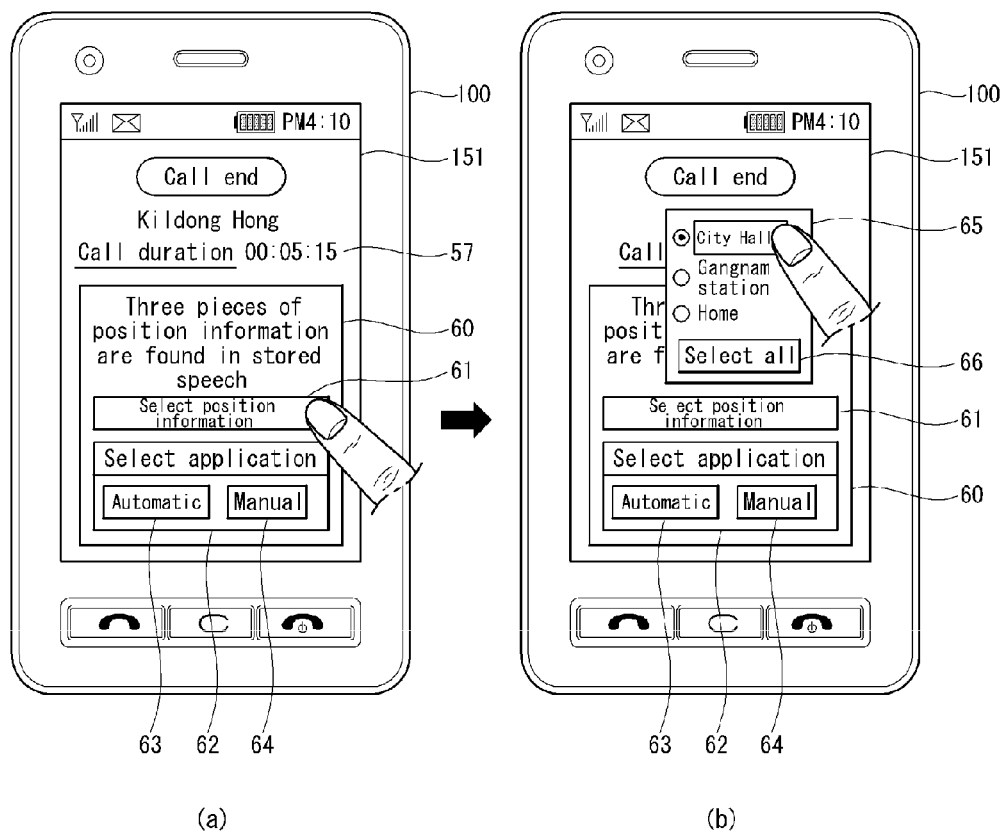
FIG. 17 illustrates an example of an image displayed at the end of the call.

FIG. 17 illustrates an example of an image displayed at the end of the call. When the call is ended, the controller 180 can inform the user that at least one piece of position information has been detected from the speech stored during the call.

Referring to FIG. 17(*a*), the controller 180 can display, on the display unit 151, an announcement message 60 announcing that three pieces of position information have been extracted from the speech stored during the call. The announcement message 60 may include a position information selection button 61 allocated with a function for selecting at least one piece of position information from the three selected pieces of position information, and a selecting region 62 for the application to be driven. The selecting region 62 may include an automatic button 63 for automatically selecting the application to be driven, and a manual button 64 allocated with a function for manually receiving the user's selection.

Referring to FIG. 17(*b*), when the position information selection button 61 is selected, the controller 180 can provide a popup window 65 such that at least one of the position information extracted from the speech stored during the call is selected. The popup window 65 may include an all selection button 66 for selecting all the extracted position information.

The user can select at least one of the extracted position information through the popup window 65.

Figure 18:
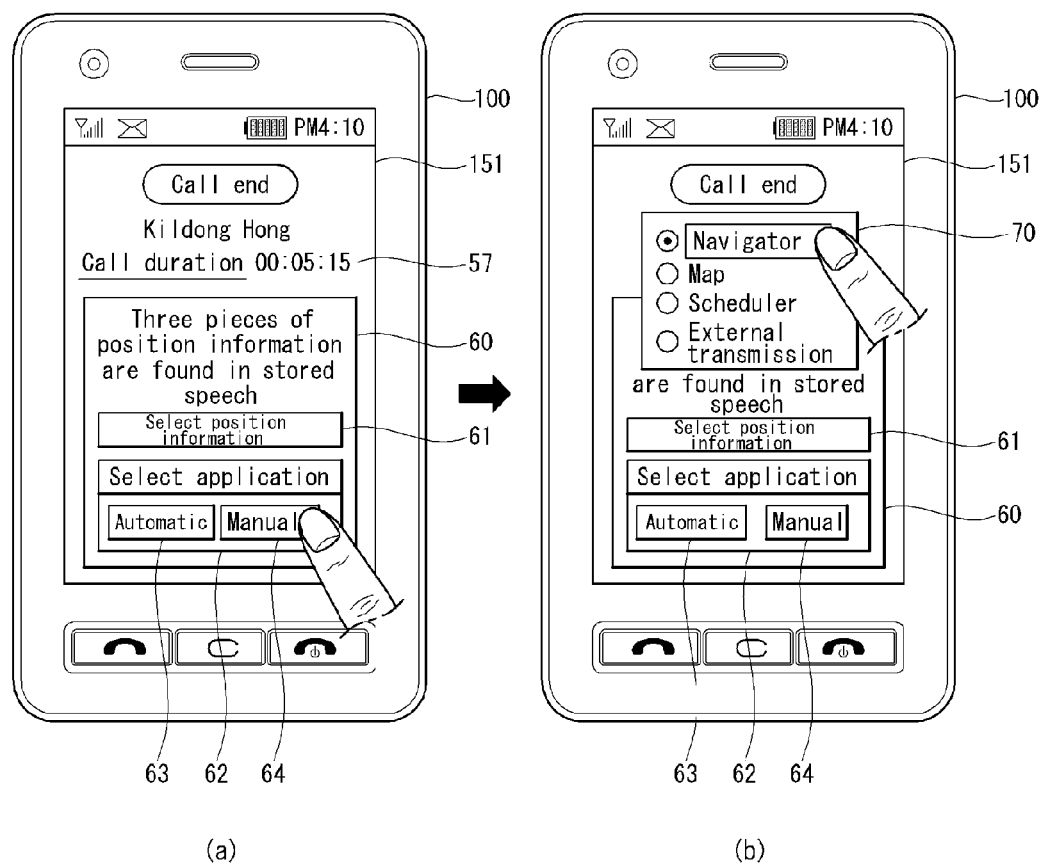
FIG. 18 illustrates an example of an image for use in selecting an application to be driven.

FIG. 18 illustrates an example of an image for use in selecting an application to be driven. In FIG. 18(*a*), when the controller 180 receives a signal selecting the automatic button 63 from the user, or does not receive a signal selecting either one of the automatic button 63 and the manual button 64 for a certain time, it can drive a pre-designated application.

When the controller 180 receives the signal selecting the manual button 64 from the user as shown in FIG. 18(*a*), it can provide a popup window 70 such that at least one application capable of using the extracted position information is selected as shown in FIG. 18(*b*). The user can select the application to use the position information extracted from the speech during the call through the popup window 70.

As illustrated in the popup window 70 of FIG. 18(*b*), exemplary applications capable of using the extracted position information are a navigator, a map application, a scheduler, a communication application for communicating with an external terminal or network, and so on.

The controller 180 can use the extracted position information in the application driven in step S310 (step S320).

FIGS. 19*a* to 19*d* are diagrams illustrating examples of step S320.

Figure 19A:
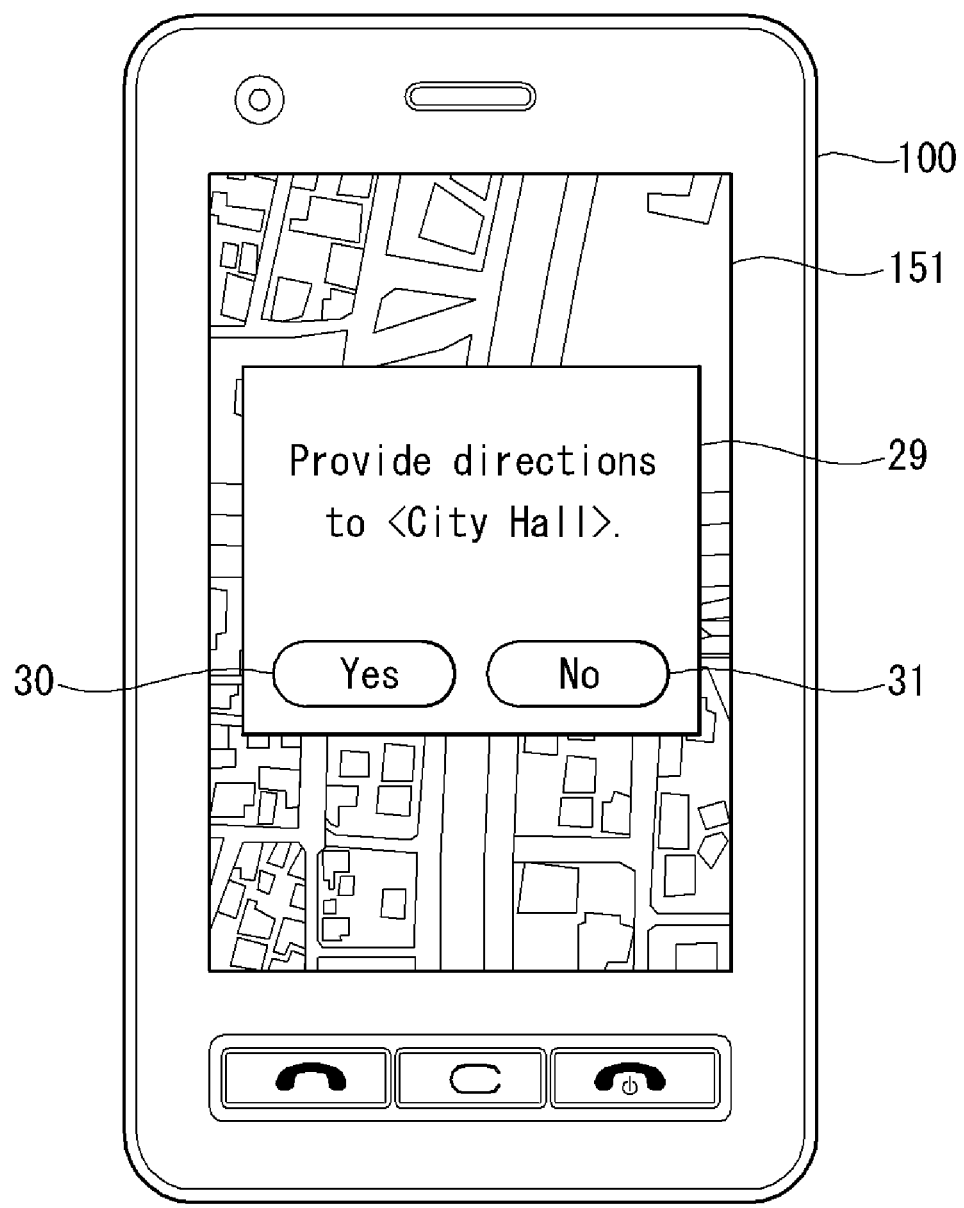
FIGS. 19a to 19d are diagrams illustrating examples of step S320.

FIG. 19a shows a case where the navigator uses the extracted position information. The navigator can provide a navigation function using a navigation satellite system, setting the extracted position information as a destination.

Figure 19B:
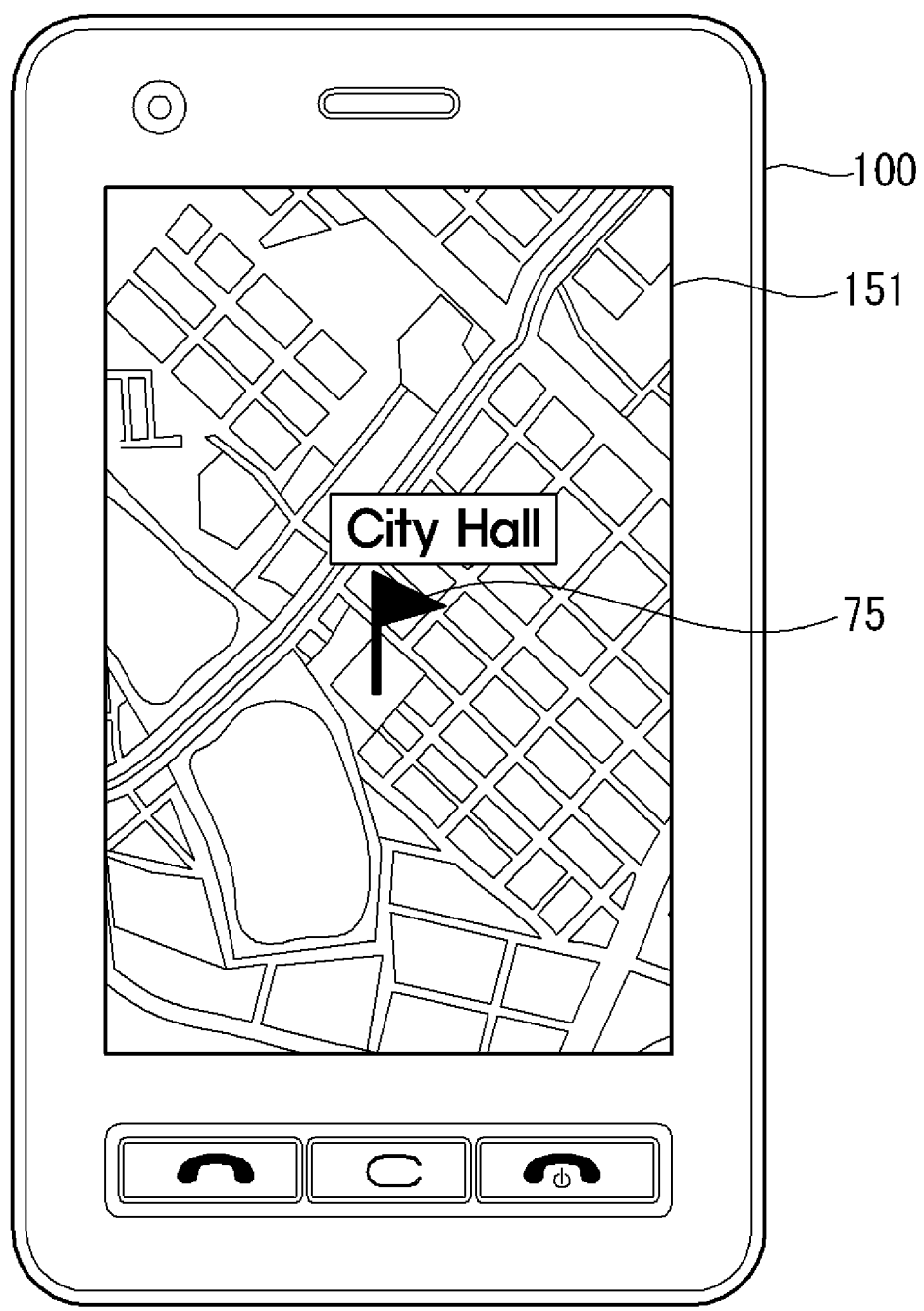

FIG. 19b shows a case where the map application uses the extracted position information. The map application displays the extracted position information on a map. Reference numeral 75 denotes a point corresponding to the extracted position information on the map.

Figure 19C:
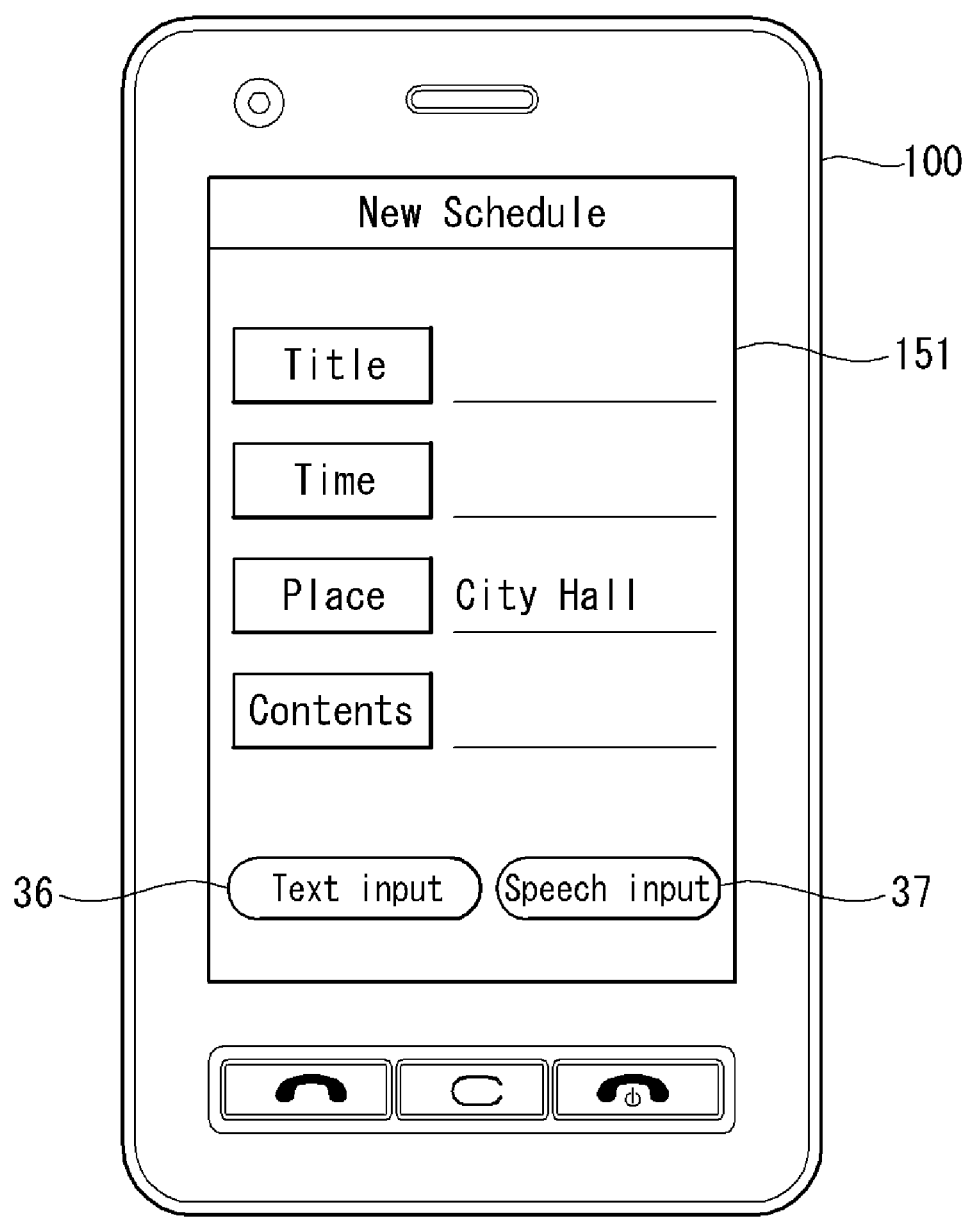

FIG. 19c shows a case where the scheduler uses the extracted position information. The scheduler can set the extracted position information as a scheduled place. As illustrated in FIG. 19c, the controller 180 can set the extracted position information to correspond to the scheduled place on the image for use in inputting new schedule information.

Figure 19D:
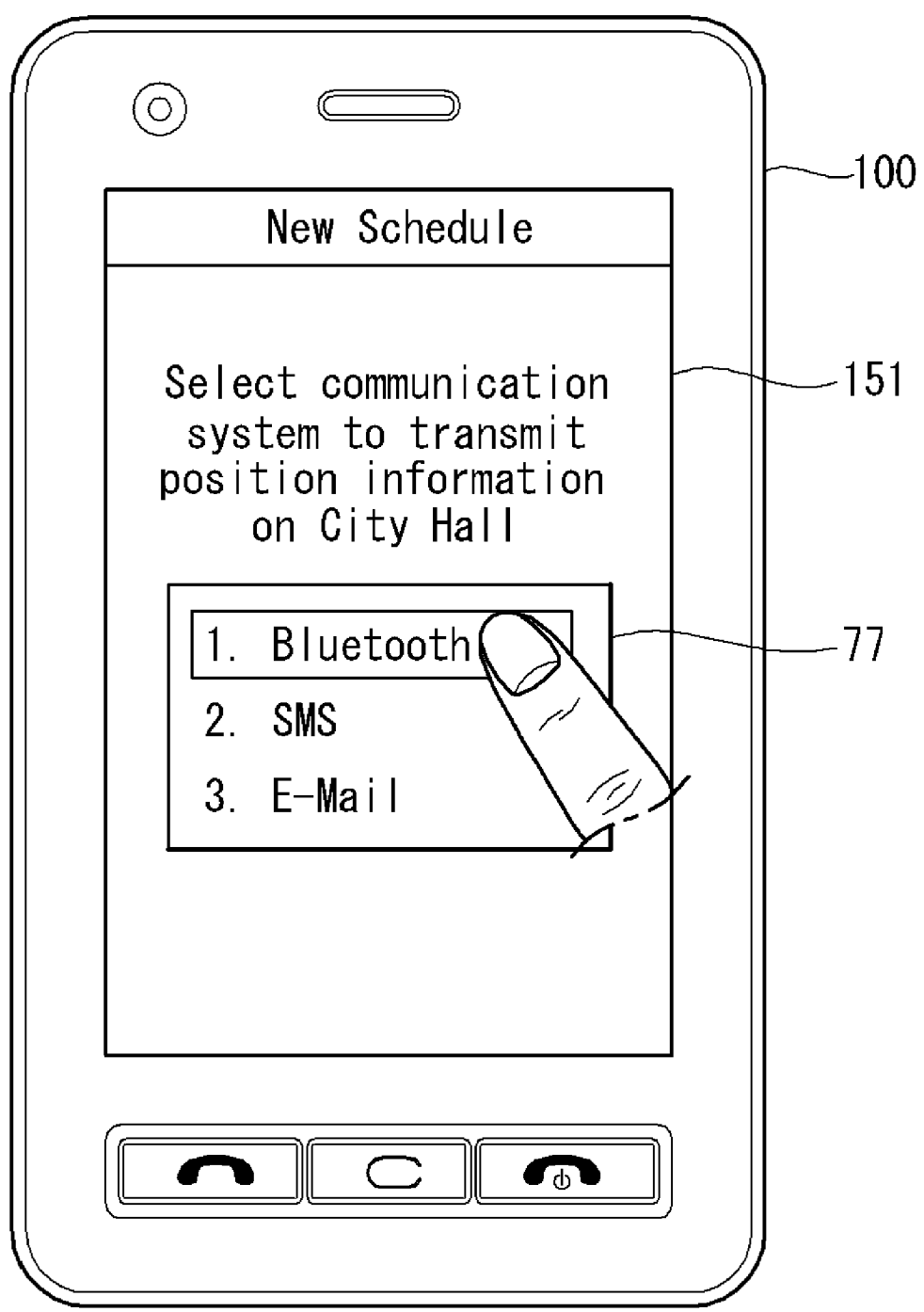

FIG. 19d shows a preparation image to use the extracted position information in the communication application. The controller 180 can transmit the extracted position information to the outside, using the communication application selected by the user or designated in advance. FIG. 19d illustrates a selecting region 77 such that any one of Bluetooth, which is a kind of local area wireless communication system, a short message system (SMS), and an E-mail, is selected. The user can select any one of the communication systems included in the selecting region 77. The controller 180 can enter a mode for transmitting the position information using the selected communication system.

For example, when Bluetooth is selected, the controller 180 can search for external terminals capable of performing communication via Bluetooth.

In addition, for example, when the SMS or the E-mail is selected, the controller 180 can automatically insert the position information into the message or the contents of the E-mail.

Figure 20:
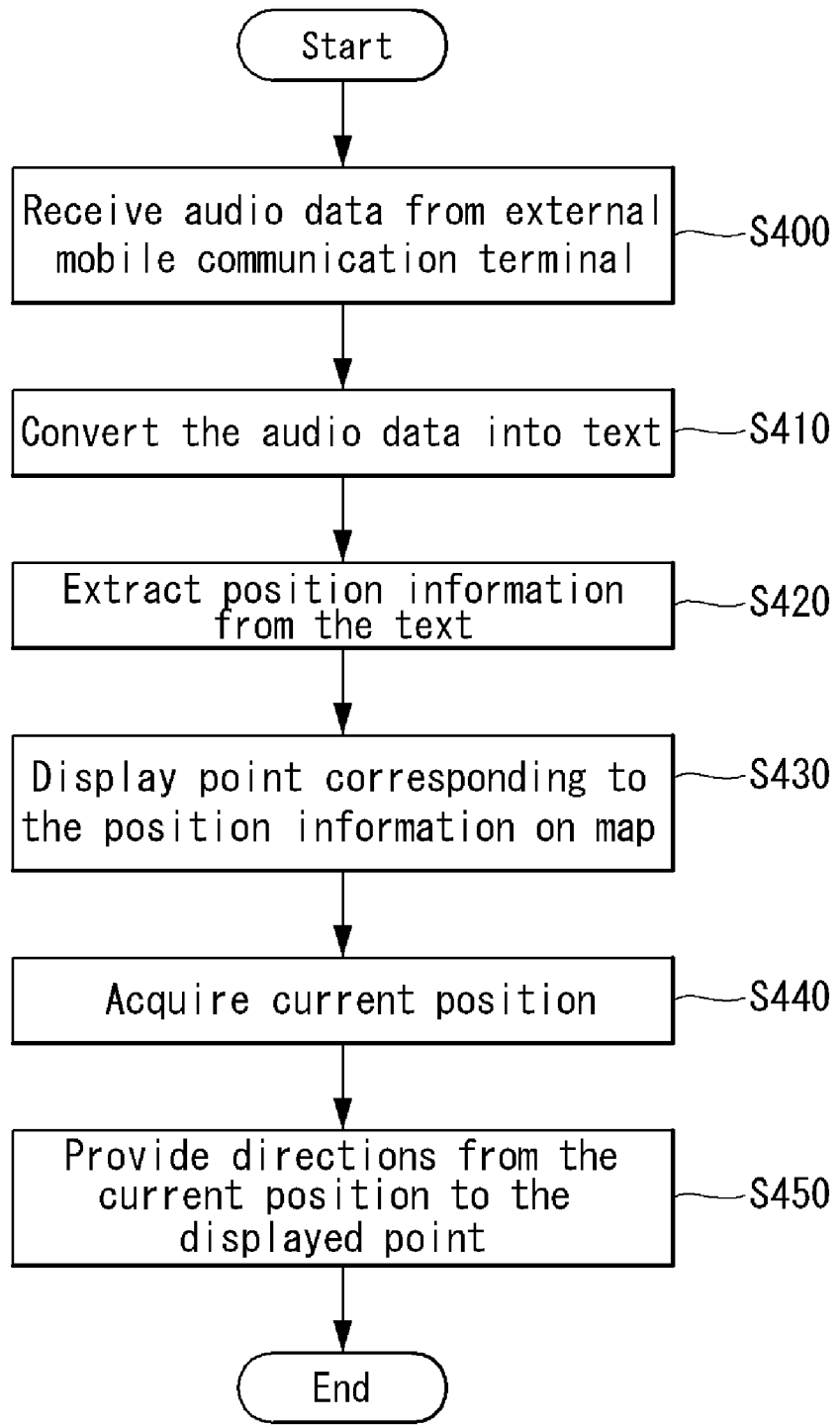
FIG. 20 is a flowchart of a method of managing position information using a mobile terminal according to a fourth embodiment of the present invention.

FIG. 20 is a flowchart of a method of managing position information using a mobile terminal according to a fourth embodiment of the present invention. The method of managing the position information using the mobile terminal according to the fourth embodiment of the present invention can be implemented in the first mobile terminal 100 or the second mobile terminal 200 explained with reference to FIGS. 1 to 4. Hereinafter, the method of managing the position information using the mobile terminal according to the fourth embodiment of the present invention and the operations of the mobile terminals 100 and 200 for implementing the same will be described in detail with reference to FIG. 20 and other necessary drawings. Here, the description is made mainly in connection with the second mobile terminal 200 assumed as a navigation device.

The controller 180 included in the second mobile terminal 200 can receive audio data from an external mobile communication terminal (step S400). The external mobile communication terminal may be the first mobile terminal 100 assumed as a cellular phone.

The controller 180 converts the received audio data into text using a speech recognition algorithm (step S410), and extracts position information from the converted text (step S420). Here, a method for extracting the position information from the text is same as described above. Here, one or more pieces of position information may be extracted.

The controller 180 can display a point corresponding to the extracted position information on a map (step S430). Also, the controller 180 can acquire a current position of the second mobile terminal 200 (step S440), and provide directions from the acquired current position to the displayed point (step S450). The above step S450 may be performed by the user's command or automatically.

When more than one piece of position information is extracted in step S420, the controller 180 can provide a user interface such that the position information is selected to provide directions. Alternatively, when more than one piece of position information is extracted, the controller 180 can provide directions along a path connecting the plurality of positions.

Figure 21:
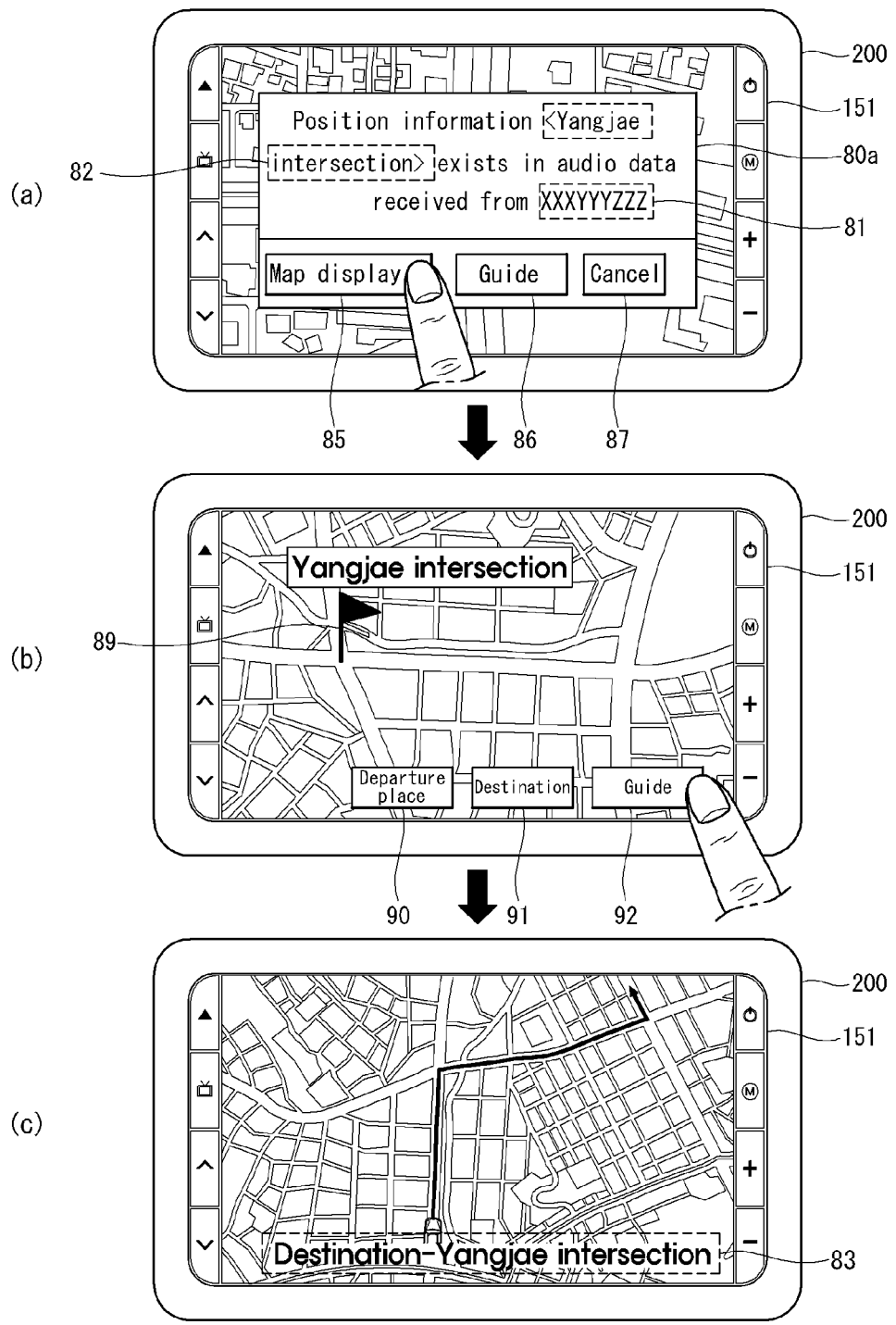
FIGS. 21 and 22 illustrate examples in which the fourth embodiment of the present invention is implemented.
Figure 22:
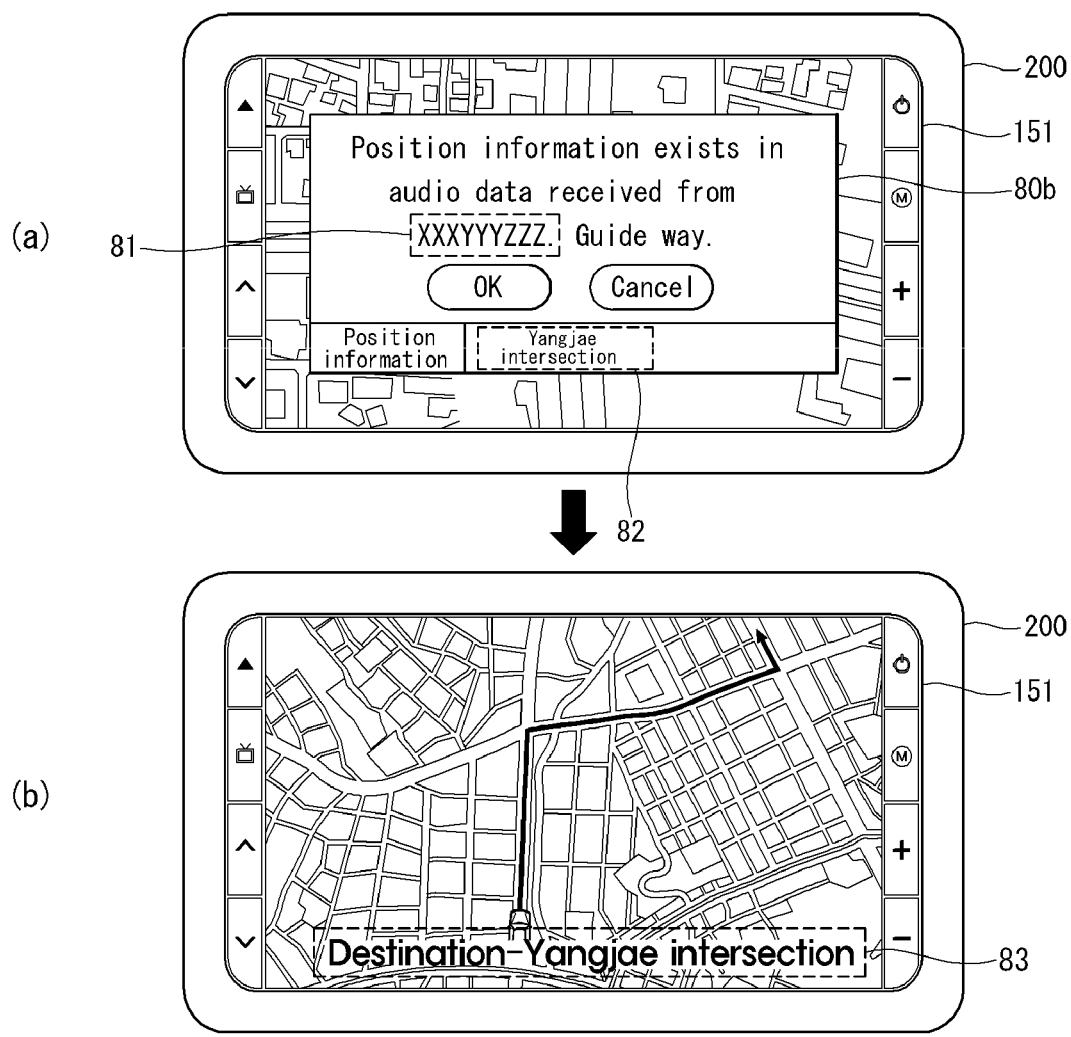

FIGS. 21 and 22 illustrate examples in which the fourth embodiment of the present invention is implemented. FIG. 21 shows a case of providing directions manually, and FIG. 22 shows a case of providing directions automatically.

Referring to FIG. 21(a), the controller 180 can provide a first announcing region 80a after performing steps S400 to S420. The first announcing region 80a may include information 81 on the external mobile communication terminal transmitting the audio data, and position information 82 extracted from the audio data. In addition, the first announcing region 80a may provide various buttons 85 and 86 such that a method using the extracted position information 82 is selected. For example, the user can select a map display button 85 allocated with a function for displaying the point corresponding to the extracted position information 82 on the map, or a guide button 86 allocated with a function for providing directions from the current position to the point corresponding to the extracted position information 82.

FIG. 21(b) is an exemplary diagram of an image when the map display button 85 is selected. The image shown in FIG. 21(b) can provide various functional buttons 90, 91 and 92. For example, the image shown in FIG. 21(b) can provide a departure place setting button 90 allocated with a function for setting the extracted position information 82 as a departure point, a destination setting button 91 allocated with a function for setting the extracted position information 82 as a destination point, and a guide button 92 allocated with the same function as the guide button 86.

FIG. 21(c) shows an example of an image in which, when the guide button 86 is selected in FIG. 21(a) or the guide button 92 is selected in FIG. 21(b), directions from the current position to the point corresponding to the extracted position information 82 are provided.

Referring to FIG. 22(a), before providing directions automatically, the controller 180 can inform the user that it is about to provide directions, and provide a second announcing region 80b to give the user a chance to cancel the directions. The user can cancel the automatic directions by selecting the 'Cancel' button.

Referring to FIG. 22(b), when the controller 180 receives a signal selecting the 'OK' button from the user in the image of FIG. 22(a) or does not receive the selection signal for a certain time, the controller 180 can start to provide directions automatically.

The method of managing the schedule using the mobile terminal and the method of managing the position information using the mobile terminal according to the present invention can be recorded on a computer-readable recording medium as a program to be executed in the computer.

The method of managing the schedule using the mobile terminal and the method of managing the position information using the mobile terminal according to the present invention can be executed through software. When they are executed through software, the components of the present invention are code segments that perform required tasks. The programs or code segments can be stored in a processor-readable medium or transmitted via a computer data signal combined with a carrier wave in a transmission medium or a communication network.

The computer-readable recording medium includes all types of recording devices storing data readable by a computer system. Exemplary computer-readable recording media include ROM, RAM, CD-ROM, DVD±ROM, DVD-RAM, magnetic tapes, floppy disks, hard disks, and optical data storage devices. In addition, the computer-readable recording medium may be distributed among network-coupled computer systems to be stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal for integrating at least two functions, the mobile terminal comprising:
   a first unit configured to receive audio data related to a first function;
   a second unit configured to convert the audio data into text information that includes position information; and
   a controller configured to process the audio data and the text information to provide a second function integrating the audio data and text information,
   wherein the second function includes a function using the position information.

2. The mobile terminal of claim 1, wherein:
   the first unit is a receiving unit configured to receive schedule information as speech;
   the second unit is a speech recognition unit configured to convert the speech into the text information using a speech recognition algorithm; and
   the controller is further configured to control the speech recognition unit to:
      convert the received schedule information into the text information;
      extract a scheduled time, a scheduled place and scheduled contents from the text information; and
      store the received schedule information in a schedule management database according to at least the extracted scheduled time, the extracted scheduled place or the extracted scheduled contents.

3. The mobile terminal of claim 2, wherein the controller is further configured to:
   provide at least one user interface to request at least the scheduled time, the scheduled place or the scheduled contents; and
   process at least the scheduled time, the scheduled place or the scheduled contents received as speech samples via the at least one user interface.

4. The mobile terminal of claim 2, wherein the controller is further configured to:
   receive the scheduled time, the scheduled place and the scheduled contents simultaneously via the receiving unit as speech regardless of order; and
   extract the scheduled time, the scheduled place and the scheduled contents from the text information by using a context analysis algorithm.

5. The mobile terminal of claim 2, wherein the controller is further configured to announce the schedule information at a preset time in consideration of the scheduled time and a current time.

6. The mobile terminal of claim 1, wherein:
   the first unit is a radio communication unit configured to perform a call function;
   the audio data comprises speech;
   the second unit is a speech recognition unit configured to convert the speech into the text information using a speech recognition algorithm; and
   the controller is further configured to:
      control the speech recognition unit to extract the position information using the speech recognition algorithm from speech of at least one participant in a call performed by the radio communication unit; and
      drive one or more applications using the extracted position information.

7. The mobile terminal of claim 6, wherein each of the one or more applications comprise a navigator that provides a navigation function using a navigation satellite system by setting the position information as a destination, a map application that displays the position information on a map, a scheduler that sets the position information as a scheduled place, or a communication application that transmits the position information to an external terminal.

8. The mobile terminal of claim 7, wherein the controller is further configured to drive the one or more applications in response to a user command or to drive a predesignated one of the one or more applications.

9. The mobile terminal of claim 6, wherein the controller is further configured to:
   store the speech of the at least one participant;
   convert the stored speech into the text information; and
   extract the position information from the text information.

10. The mobile terminal of claim 1, wherein:
    the first unit is a radio communication unit configured to provide a communication function via a network;
    the audio data comprises speech;
    the second unit is a speech recognition unit configured to convert the speech into the text information using a speech recognition algorithm; and
    the controller further configured to:
       control the radio communication unit to receive the audio data from an external mobile communication terminal;
       control the speech recognition unit to convert the received audio data into the text information;
       extract the position information from the text information; and
       display a point corresponding to the extracted position information on a map.

11. The mobile terminal of claim 10, further comprising a position information module configured to acquire position information using a navigation satellite system, wherein the controller is further configured to acquire a current position using the position information module and provide directions from the current position to a position corresponding to the displayed point.

12. A mobile terminal, comprising:
    a receiving unit configured to receive schedule information including a scheduled place and a scheduled time;
    a position information unit configured to acquire position information; and
    a controller configured to:
       determine an expected travel time from a current position acquired by the position information unit to the scheduled place;
       calculate a remaining travel time based on a difference between the scheduled time and a current time; and
       announce the schedule information according to whether the expected travel time exceeds the remaining travel time.

13. The mobile terminal of claim 12, further comprising a memory configured to store a map, wherein the controller is further configured to determine the expected travel time in consideration of road information included in the map.

14. The mobile terminal of claim 13, wherein the controller is further configured to determine the expected travel time in consideration of traffic situation information stored in the memory or received from an external source.

15. The mobile terminal of claim 13, wherein the controller is further configured to update the current position and the expected travel time periodically.

16. The mobile terminal of claim 12, wherein the controller is further configured to announce the schedule information periodically or at a preset time before the remaining travel time and the expected travel time are the same.

17. The mobile terminal of claim 12, wherein the controller is further configured to provide directions from the current position to the scheduled place in response a user command or automatically in consideration of the expected travel time.

18. The mobile terminal of claim 12, wherein the receiving unit is a user input module configured to receive the schedule information input by a user or a communication module configured to receive the schedule information from an external mobile terminal via a network.

19. A method of integrating at least two functions in the mobile terminal, the method comprising:
  receiving audio data related to a first function;
  converting the audio data into text information that includes position information; and
  processing the audio data and the text information to provide a second function integrating the audio data and text information,
  wherein the second function includes a function using the position information.

20. The method of claim 19, wherein the audio data is speech of at least one participant in a call and further comprising:
  extracting the position information from the text information using a speech recognition algorithm and further comprising; and
  driving one or more applications using the extracted position information.

21. The method of claim 19, wherein the audio data is received from an external source and further comprising:
  converting the received audio data into the text information using a speech recognition algorithm;
  extracting the position information from the text information; and
  displaying a point corresponding to the extracted position information on a map.

22. A method of managing information in a mobile terminal, the method comprising:
  receiving schedule information including a scheduled place and a scheduled time;
  acquiring position information about a current position;
  determining an expected travel time from the current position to the scheduled place;
  calculating a remaining travel time based on a difference between the scheduled time and a current time; and
  announcing the schedule information according to whether the expected travel time exceeds the remaining travel time.

23. The method of claim 22, wherein the schedule information is received as speech and further comprising:
  converting the received schedule information into text information using a speech recognition algorithm;
  extracting the scheduled time, the scheduled place and scheduled contents from the text information; and
  storing the schedule information in a schedule management database according to at least the extracted scheduled time, the extracted scheduled place or the extracted scheduled contents.

* * * * *